United States Patent
Takeuchi et al.

(10) Patent No.: US 11,201,325 B2
(45) Date of Patent: Dec. 14, 2021

(54) REGENERABLE BATTERY ELECTRODE

(71) Applicants: Brookhaven Science Associates, LLC, Upton, NY (US); The Research Foundation for The State University of new York, Albany, NY (US)

(72) Inventors: Esther Sans Takeuchi, South Setauket, NY (US); Altug S. Poyraz, Kennesaw, GA (US); Kenneth James Takeuchi, South Setauket, NY (US); Amy Catherine Marschilok, Stony Brook, NY (US)

(73) Assignees: BROOKHAVEN SCIENCE ASSOCIATES, LLC, Upton, NY (US); The Research Foundation of The University of New York, Albany, NY (US)

( * ) Notice: Subject to any disclaimer, the term of this patent is extended or adjusted under 35 U.S.C. 154(b) by 255 days.

(21) Appl. No.: 15/772,564

(22) PCT Filed: Nov. 28, 2016

(86) PCT No.: PCT/US2016/063814
§ 371 (c)(1),
(2) Date: May 1, 2018

(87) PCT Pub. No.: WO2017/095728
PCT Pub. Date: Jun. 8, 2017

(65) Prior Publication Data
US 2018/0261839 A1  Sep. 13, 2018

Related U.S. Application Data

(60) Provisional application No. 62/261,562, filed on Dec. 1, 2015.

(51) Int. Cl.
*H01M 4/505* (2010.01)
*H01M 4/131* (2010.01)
(Continued)

(52) U.S. Cl.
CPC ........ *H01M 4/505* (2013.01); *C01G 45/1228* (2013.01); *H01M 4/131* (2013.01);
(Continued)

(58) Field of Classification Search
CPC ............................... H01M 6/52; H01M 10/54
See application file for complete search history.

(56) References Cited

U.S. PATENT DOCUMENTS 8,974,960 B2   3/2015   Manthiram et al.
2006/0049101 A1*  3/2006   Suib ................... B01D 67/0039
                                                      210/500.21

(Continued)

OTHER PUBLICATIONS

Zhang et al., "Fabrication of a Vertically Aligned Carbon Nanotube Electrode and its Modification by Nanostructured MnO2 for Supercapacitors", Pure Appl. Chern, vol. 81, No. 12, pp. 2317-2325 (2009).

(Continued)

*Primary Examiner* — Nathanael T Zemui
(74) *Attorney, Agent, or Firm* — Dorene Price

(57) ABSTRACT

A binder-free, self-supporting electrode including an electrochemically active material in the absence of a binder and a current collector is claimed. The electrochemically active material is a self-supporting transition metal oxide. A method of regenerating the electrode to restore capacity of the electrode is also claimed.

10 Claims, 14 Drawing Sheets

(51) Int. Cl.
H01M 10/052 (2010.01)
H01M 10/54 (2006.01)
H01M 4/48 (2010.01)
H01M 4/62 (2006.01)
C01G 45/12 (2006.01)

(52) U.S. Cl.
CPC ............ *H01M 4/48* (2013.01); *H01M 4/624* (2013.01); *H01M 4/625* (2013.01); *H01M 10/052* (2013.01); *H01M 10/54* (2013.01); *C01P 2006/40* (2013.01); *H01M 2220/30* (2013.01); *Y02T 10/70* (2013.01); *Y02W 30/84* (2015.05)

(56) References Cited

U.S. PATENT DOCUMENTS

| | | | |
|---|---|---|---|
| 2009/0214933 A1 | 8/2009 | Sloop | |
| 2010/0196762 A1* | 8/2010 | Yamamoto | C01G 45/02 429/231.6 |
| 2011/0070495 A1 | 3/2011 | Ban et al. | |
| 2013/0065130 A1* | 3/2013 | Ban | H01M 4/131 429/221 |
| 2013/0089790 A1 | 4/2013 | Byon et al. | |
| 2013/0266855 A1 | 10/2013 | Kim et al. | |
| 2016/0251740 A1* | 9/2016 | Bi | H01M 10/54 75/353 |
| 2017/0263931 A1* | 9/2017 | Wu | C01G 45/1228 |

OTHER PUBLICATIONS

Rosolen et al., "Carbon Nanotube/Felt Composite Electrodes without Polymer Binders", Journal of Power Sources, vol. 162, Issue 1, (abstract) (2006).
Ha et al., "Binder-Free and Carbon-Free Nanoparticle Batteries: A Method for Nanoparticle Electrodes without Polymeric Binders or Carbon Black", Nano Lett. 12(10) (abstract) (2012).
Xu et al., "High Capacity Silicon Electrodes with Nation as Binders for Lithium-Ion Batteries", Journal of The Electrochemical Society, 163(3) A401-A405 (2016).
Poyraz et al., "Effective Recycling of Manganese Oxide Cathodes for Lithium Based Batteries" Green Chemistry, 18, 3414-3421 (2016).
Lu et al., "Lignin as a Binder Material for Eco-Friendly Li-Ion Batteries", Materials, 9, 127 1-17 (2016).
Li et al., "Mesoporous CO3O4 Nanowire Arrays for Lithium Ion Batteries with High Capacity and Rate Capability", Nano Letters, vol. 8, No. 1, 265-270 (2008).
Yuan et al., "Superwetting Nanowire Membranes for Selective Absorption", Nature Nanotechnology, vol. 3, 332-336 (2008).
Yuan et al., "Spontaneous Formation of Inorganic Paper-Like Materials", Adv. Mater. 16, No. 19, 1729-1732 (2004).
Wang et al., "Slurryless Li2S/Reduced Graphene Oxide Cathode paper for High-Performance Lithium Sulfur Battery", Nano Letters, 15, 1796-1802 (2015).
Noerochim et L., "Rapid Synthesis of Free-Standing MoO3/Graphene Films by the Microwave Hydrothermal Method as Cathode for Bendable Lithium Batteries" Journal of Power Sources, 228, 198-205 (2013).
Tu et al., "Mushroom-Like Au/NiCo2O4 Nanohybrids as High-Performance Binder-Free Catalytic Cathodes for Lithium-Oxygen Batteries", J Mater Chem A. 3, 5714-5721 (2015).
Lalia et al., "Microbundles of Carbon Nanostructures of Binder Free Highly Conductive Matrix for LiFePO4 Battery Cathode", Journal of Power Sources, 278, 314-319 (2015).
Yun et al., "Free-Standing Heterogeneous Hybrid Papers Based on Mesoporous γ-MnO2 Particles and Carbon Nanotudes for Lithium-Ion Battery Anodes", Journal of Power Sources, 244, 747-751 (2013).

Hu et al., "Free-Standing Graphene-Carbon Manotube Hybrid Papers Used as Current Collector and Binder Free Anodes for Lithium Ion Batteries", Journal of Power Sources, 237, 41-46 (2013).
Ozcan et al., "Free Standing Flexible Graphene Oxide + α-MnO2 Composite Cathodes for Li-Air Batteries", Solid State Ionics, 286, 34-39 (2016).
Cui et al., "Light-Weight Free-Standing Carbon Nanotube-Silicon Films for Anodes of Lithium Ion Batteries", ACS Nano, vol. 4, No. 7, 3671-3678 (2010).
Seng et al., "Free-Standing V2O5 Electrode for Flexible Lithium Ion Batteries", Electrochemistry Communications, 13, 383-386(2011).
Noerochim et al., "Free-Standing Single-Walled Carbon Nanotube/SnO2 Anode Paper for Flexible Lithium-ion Batteries", SciVerse ScienceDirect, Carbon 50, 1289-1297 (2012).
Zhu et al., "Free-Standing Na2/3Fe/1/2Mn1/2O2@Graphene Film for a Sodium-Ion Battery Cathode", ACS Applied Materials & Interfaces, 4242-4247 (2014).
Yu et al., "Free-Standing Layer-By-Layer Hybrid Thin Film of Graphere-MnO2 Nanotube as Anode for Lithium Ion Batteries", The Journal of Physical Chemistry Letters, 2, 1855-1860 (2011).
Chou et al.,"Electrodeposition of MnO2 Nanowires on Carbon Nanotube Paperas Free-Standing, Flexible Electrode for Supercapacitors", Electrochemistry Communications, 10, 1724-1727 (2008).
Wang et al., "Free-Standing and Binder-Free Lithium-Ion Electrodes Based on Robust Layered Assembly of Graphene and CO3O4 Nanosheets", Nanoscale, 5, 6960-6967 (2013).
Zhang et al., "Free-Standing and Bendable Carbon Nanotubes/TiO2 Nanofibres Composite Electrodes for Flexible Lithium Ion Batteries", Electrochimica Acta, 104, 41-47 (2013).
Hu et al., "Folding Insensitive, High Energy Density Lithium-Ion Battery Featuring Carbon Nanotube Current Collectors", ScienceDirect, Carbon 87, 292-298 (2015).
Zeng et al., "Flexible One-Dimensional Carbon-Selenium Composite Nanofibers with Superior Electrochemical Performance for Li—Se/Na—Se Batteries", Journal of Power Sources, 281, 461-469 (2015).
Wang et al., "Flexible Free-Standing Hollow Fe3O4/Graphene Hybrid Films for Lithium-Ion Batteries", J. Mater. Chem. A., 1794-1800 (2013).
Liang et al., "Flexible Free-Standing Graphene/SnO2 Nanocomposites Paper for Li-Ion Battery", ACS Appl. Mater. Inferfaces, 4, 5742-5748 (2012).
Xiong et al., "Fabrication of Silver Vanadium Oxide and V2O5 Nanowires for Electrochromics", American Chemical Society, vol. 2, No. 2, 293-301 (2008).
Yue et al., "Enhanced Reversible Lithium Storage in a Nano-Si/MWCNT Free-Standing Paper Electrode Prepared by a Simple Fillration and Post Sintering Process", Electrochimica Acta, 76, 326-332 (2012).
Zhang et al., "Effect of Thermal Treatment on the Properties of Electrospun LiFePO4-Carbon Nanofiber Composite Cathode Materials for Lithium-Ion Batteries", Journal of Alloys and Compounds, 627, 91-100 (2015).
Cao et al., "Integrated Fast Assembly of Free-Standing Lithium Titanate/Carbon Nanotube/Cellulose Nanofiber Hybrid Network Film as Flexible Paper-Electrode for Lithium-Ion Batteries", ACS Appl. Mater. Interfaces, 7, 10695-10701 (2015).
Wang et al., "Direct Growth of Flower-Like 3D MnO2 Ultrathin Nanosheets on Carbon Paper as Efficient Cathode Catalyst for Rechargeable Li-O2 Batteries", RSC Adv. 5, 72495-72499 (2015).
Reddy et al., "Coaxial MnO2/Carbon Nanotube Array Electrodes for High-Performance Lithium Batteries", Nano Letters, vol. 9, No. 3, 1002-1006 (2009).
Zhang et al., "Coating of αMoO3 on Nitrogen-Doped Carbon Nanotubes by Electrodeposition as a High-Performance Cathode Material for Lithium-Ion Batteries", Journal of Power Sources, 274, 1063-1069 (2015).
Lee et al., "Carbon Nanotube/Manganese Oxide Ultrathin Film Electrodes for Electrochemical Capacitors", ACS Nano, vol. 4, No. 7, 3889-3896 (2010).

(56) References Cited

OTHER PUBLICATIONS

Sun et al., "A Composite Film of Reduced Graphene Oxide Modified Vanadium Oxide Nanoribbons as a Free Standing Cathode Materials for Rechargeable Lithium Batteries", Journal of Power Sources, 241, 168-172 (2013).
Wang et al., "Binder-Free V2O5 Cathode for Greener Rechargeable Aluminum Battery", ACS Appl. Mater. Interfaces, 7, 80-84(2015).
Fu et al., "Aligned Carbon Nanotube-Silicon Sheets: A Novel Nano-Architecture for Flexible Lithium Ion Battery Electrodes", Adv. Mater., 25, 5109-5114 (2013).
Cheng et al.,"Synergistic Effects from Graphene and Carbon Nanotubes Enable Flexible and Robust Electrodes for High-Performance Supercapacitors", Nano Letters, 12, 4206-4211 (2012).
Su et al., "A New Approach to Improve Cycle Perforance of Rechargeable Lithium-Sulfur Batteries by Inserting a Free-Standing MWCNT Interlayer", ChemCommun., 48, 8817-8819 (2012).
Han et al., "A Free-Standing and Ultralong-Life Lithium-Selenium Battery Cathode Enabled by 3D Mesoporous Carbon/Graphene Hierarchical Architecture", Adv. Functional Materials, 25, 455-463 (2015).
Pang et al.,"Evidence of Solid-Solution Reaction Upon Lithium Insertion into Cryptomelane K0.25Mn2O4 Material", J. Phys. Chem. C., 118(8), Abstract (2014).
International Search Report for corresponding International Application No. PCT/US2016/063814, p. 1-2 ( dated Mar. 13, 2017).

\* cited by examiner

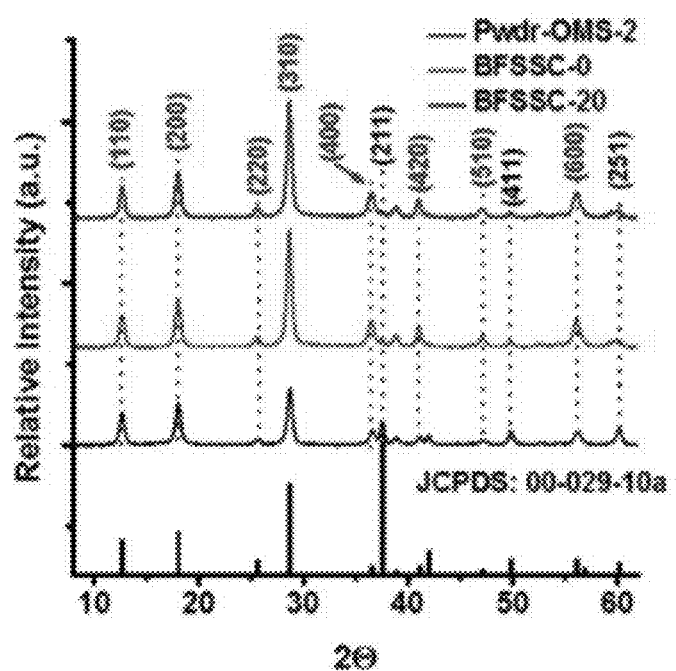
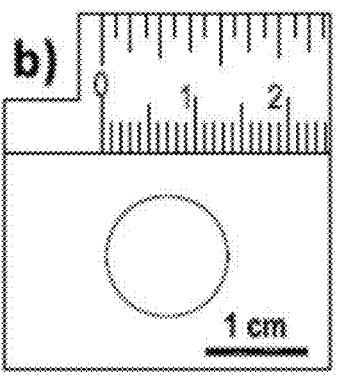
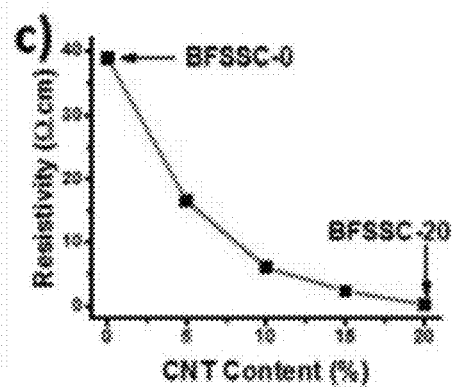
FIGs. 1a), 1b), and 1c)

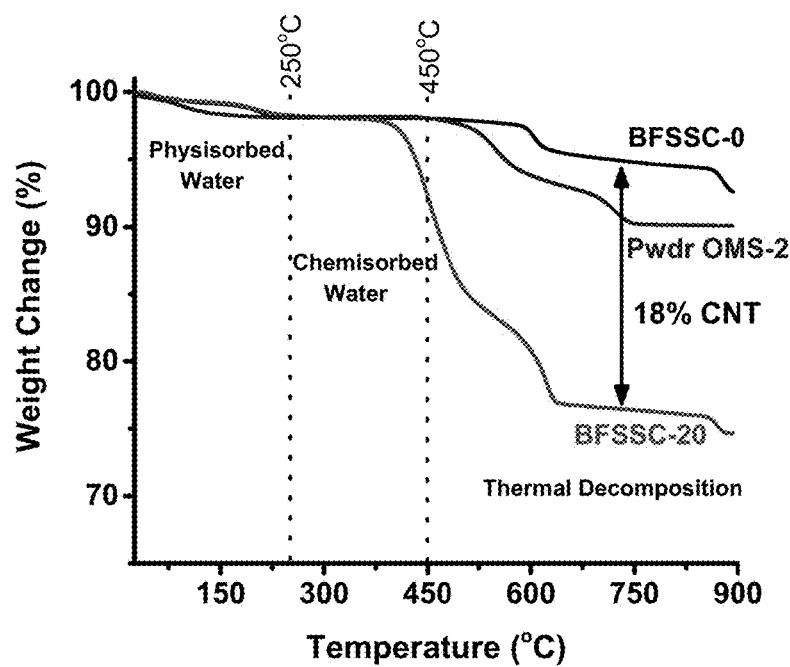
FIG. 2
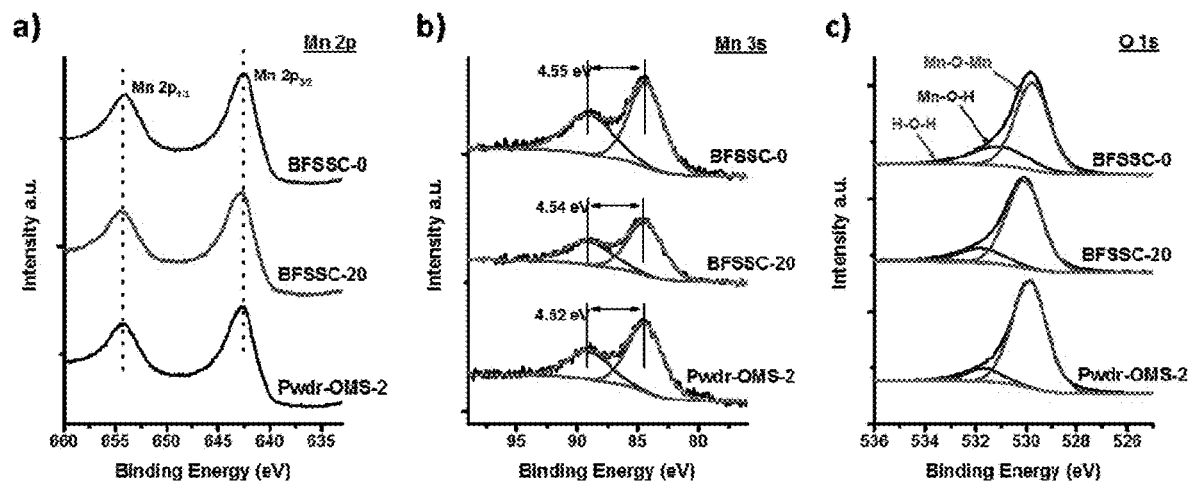
FIGs. 3a), 3b), and 3c)

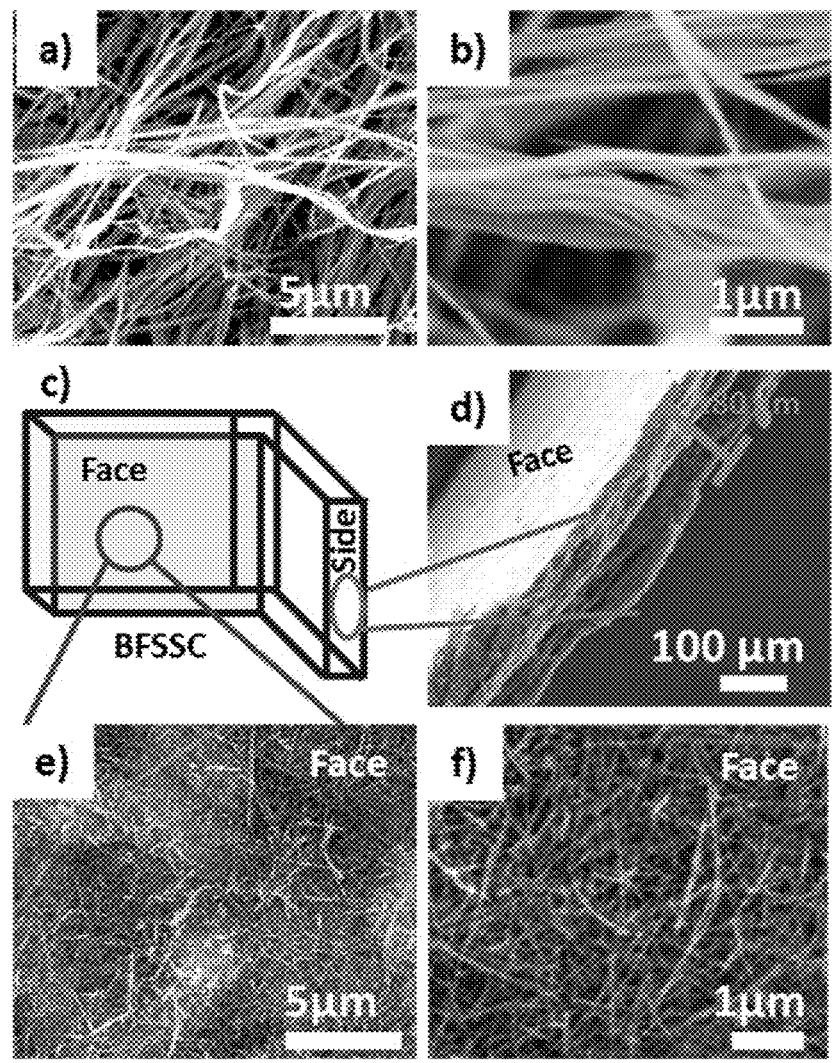
FIGs. 4a), 4b), 4c), 4d), 4e), and 4f)

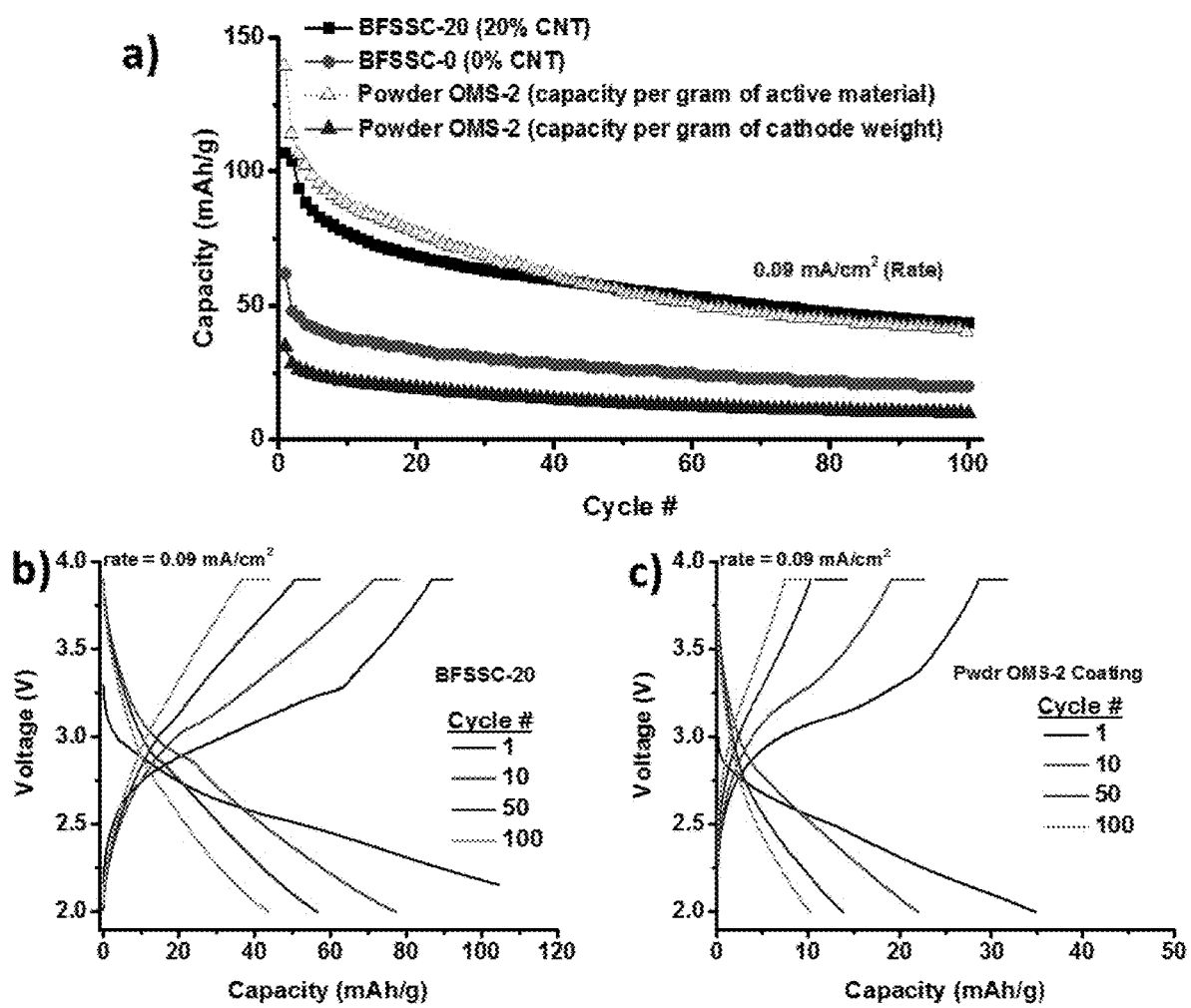
FIGs. 5a), 5b), and 5c)

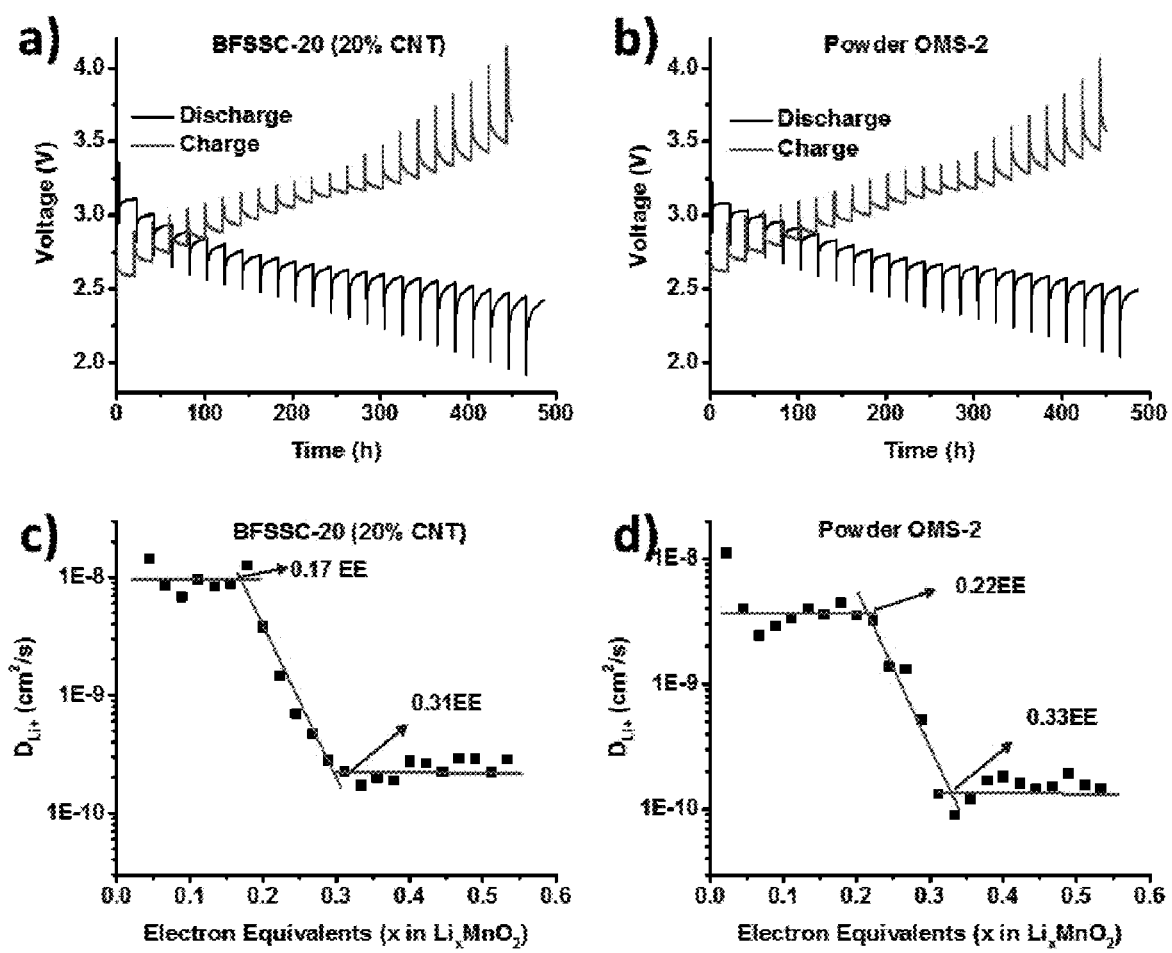
FIGs. 6a), 6b) 6c), and 6d)

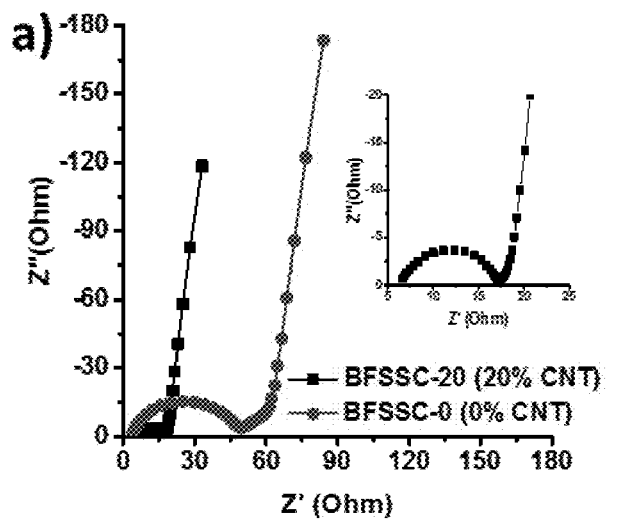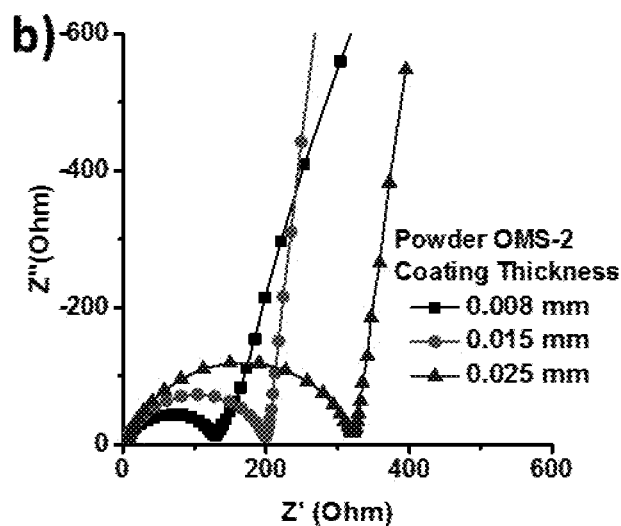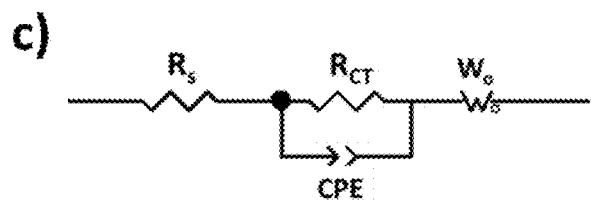
FIGs. 7a), 7b), and 7c)

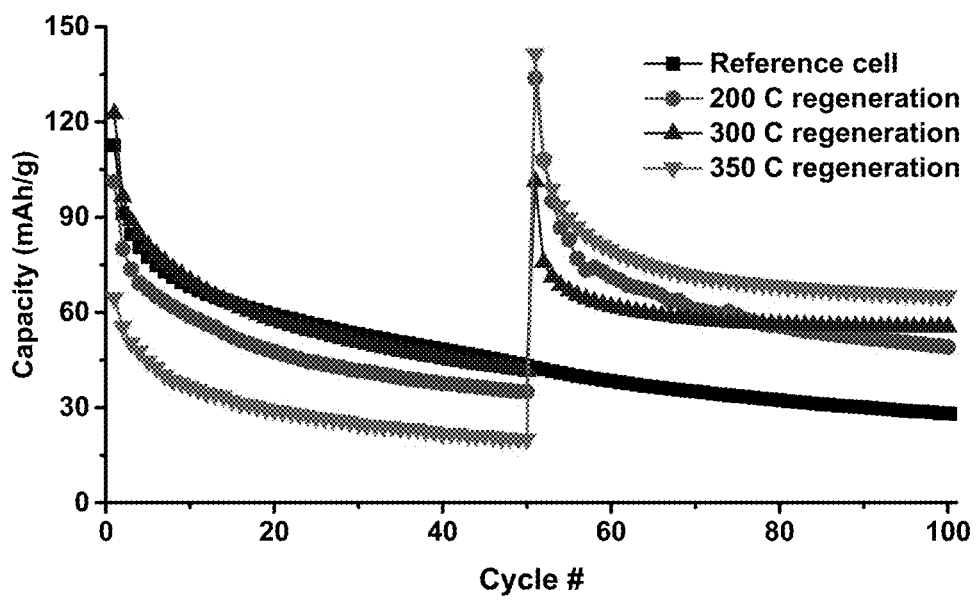
FIG. 8
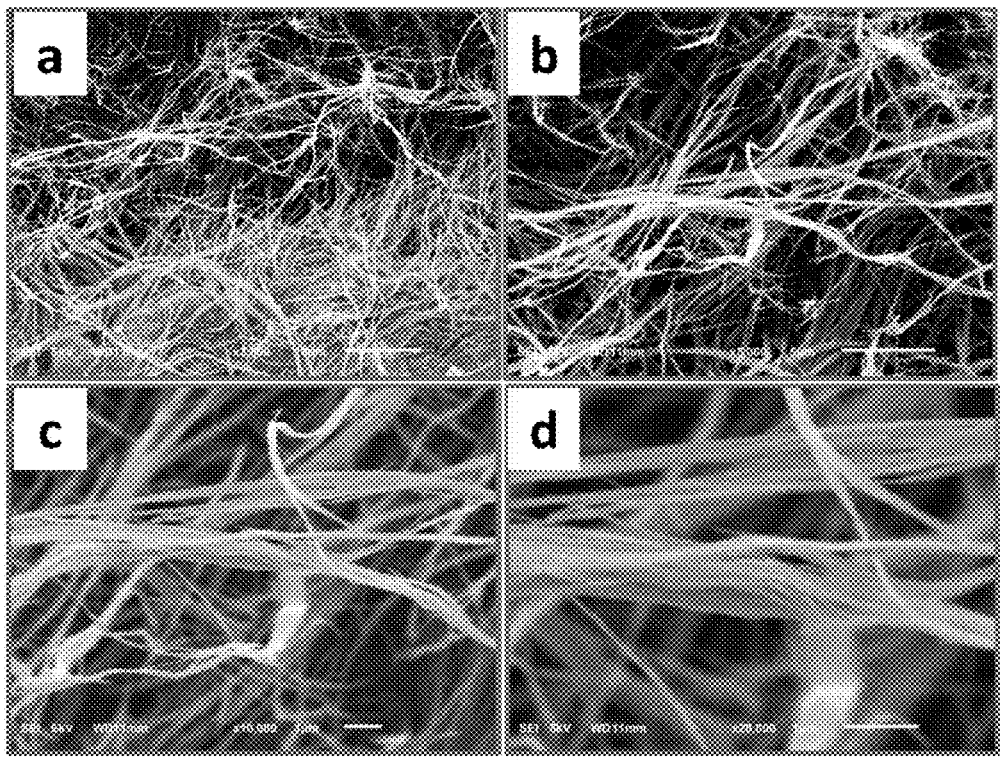
FIGs. 9a), 9b), 9c), and 9d)

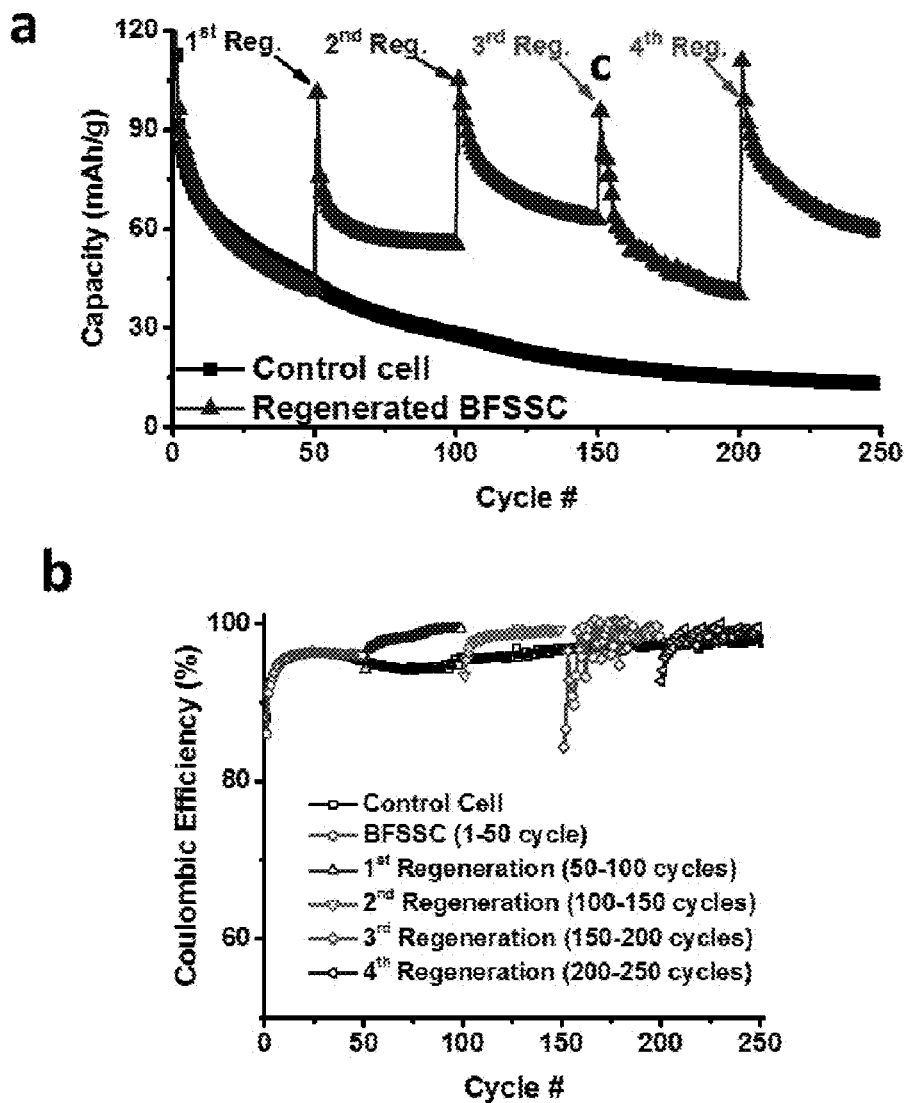
FIGs. 10a) and 10b)

FIGs. 12a), 12b), 12c), and 12d)

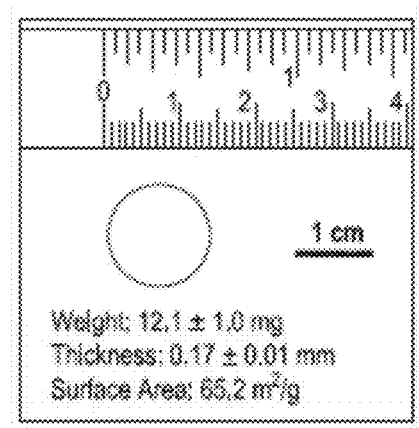
FIG. 13
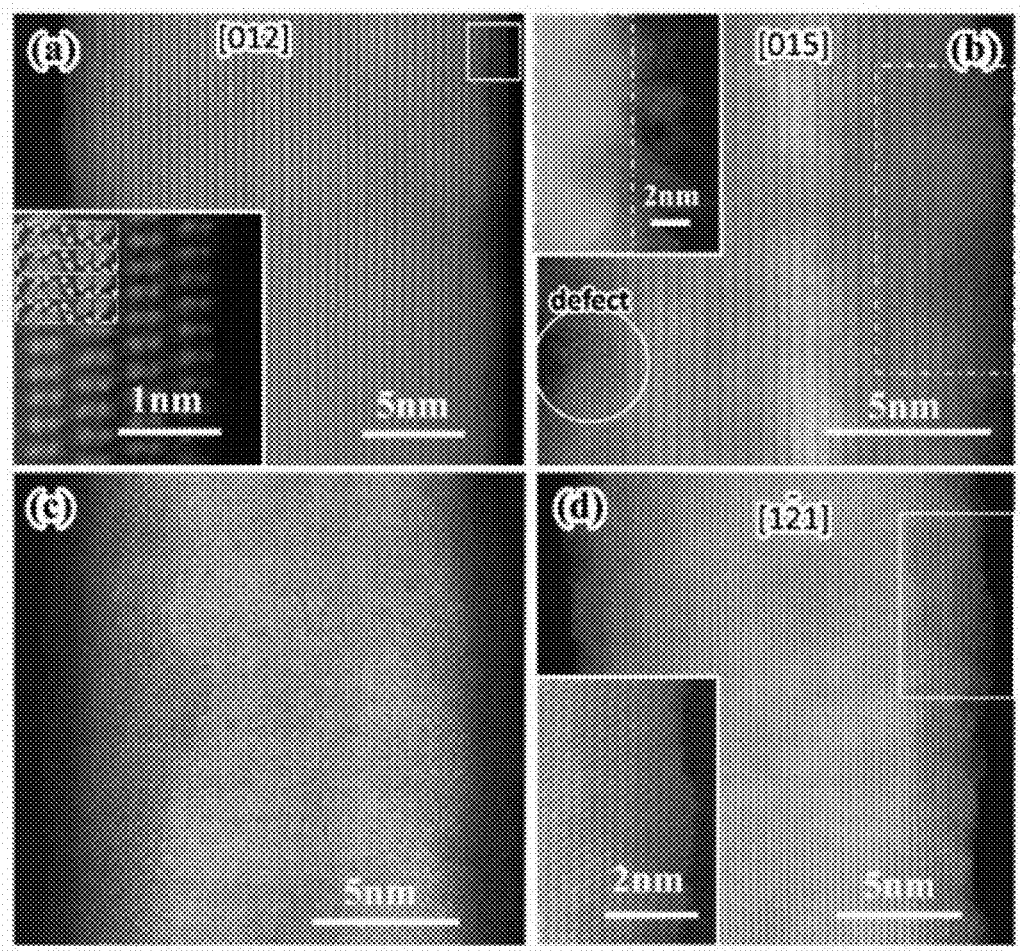
FIGs. 14(a), 14(b), 14(c), and 14(d)

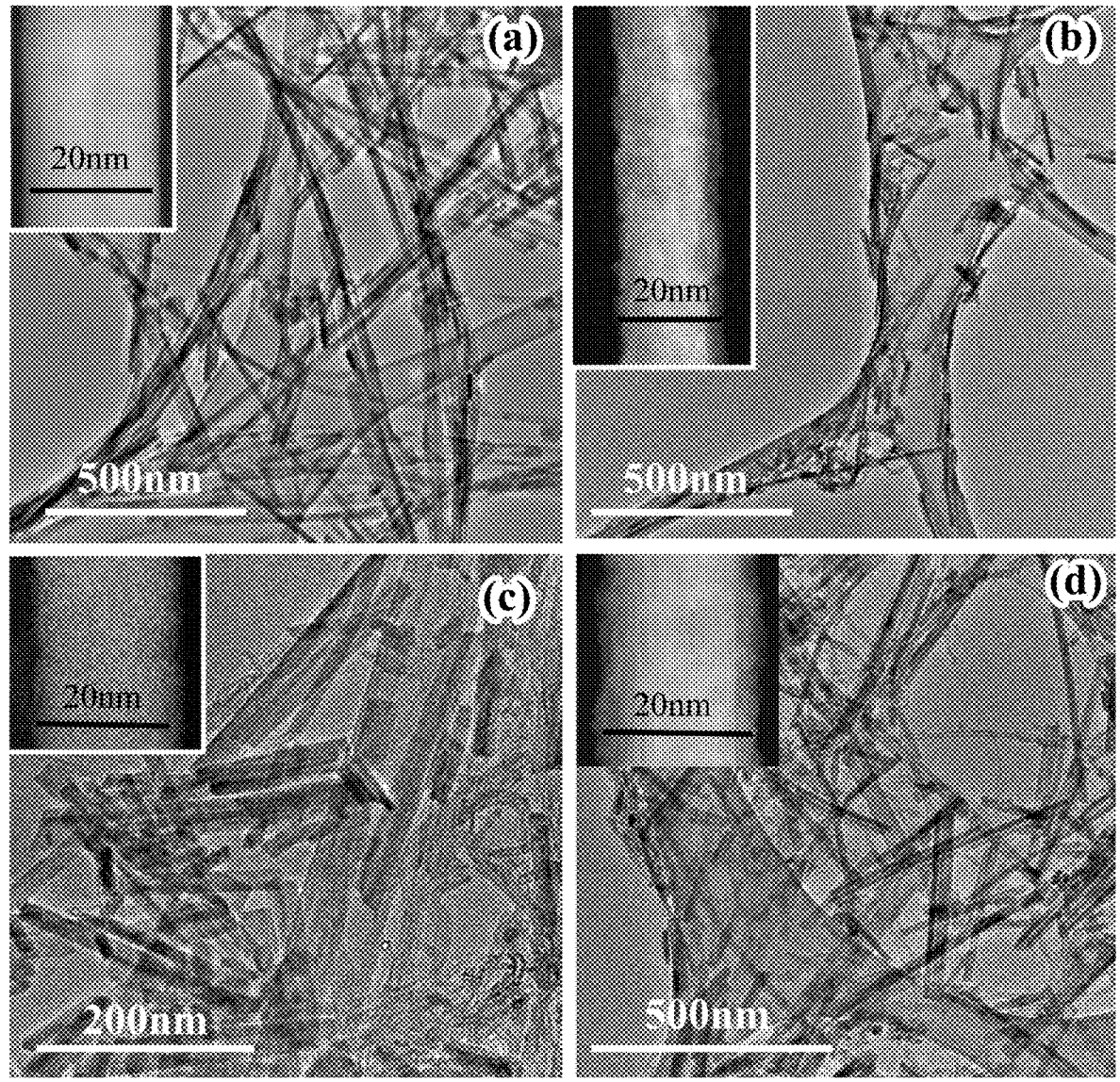
FIGs. 19(a), 19(b), 19(c), and 19(d)

REGENERABLE BATTERY ELECTRODE

CROSS-REFERENCE TO RELATED APPLICATION

This application claims priority to International Application No. PCT/US2016/063814 filed on Nov. 28, 2016 which claims priority to U.S. Provisional Application No. 62/261,562 filed on Dec. 1, 2015, the contents of which are herein incorporated by reference in their entirety.

STATEMENT OF GOVERNMENT LICENSE RIGHTS

This invention was made with Government support under contract number DE-SC0012704, awarded by the U.S. Department of Energy. The United States Government has certain rights in this invention.

BACKGROUND OF THE INVENTION

Portable electric energy storage issues associated with devices such as consumer electronics and electric vehicles, along with stationary electric energy storage concerns associated with renewable energy generation and the grid, continue to stimulate research in electric energy storage, including batteries. Thus, rechargeable lithium ion batteries (LIBs) occupy a prominent consumer presence due to their high cell potential and gravimetric energy density. However, long electrode cycle lifetimes of LIBs remain a challenge. While a number of factors can contribute to limited LIB usable cycle lifetimes, cathode degradation is a significant factor. Thus, a variety of LIB cathode materials have been studied, including oxides of a variety of first row transition metals (i.e. Mn, Fe, V, Co, and Ni). Under extended lithiation/delithiation cycling, issues including structural strain, amorphization, and irreversible phase changes typically occur at the LIB cathode, resulting in an irreversible capacity loss. Thus environmental concerns, such as disposal and recycling issues, and economic concerns remain.

Currently used or proposed cathode recycling processes are multistep procedures which involve sequences of mechanical, thermal, and chemical leaching steps. During the mechanical recycling processes, the used cathodes are mechanically crushed and sieved multiple times and the components of the cathode are separated magnetically, gravimetrically (by density), and/or by size (sieving). However, separation is not always efficient; therefore further chemical leaching processes are frequently required for total recovery. Acid digestion is the most common chemical leaching process, and uses highly corrosive concentrated acids or bases. In addition, chemical leaching also requires a neutralizing chemical treatment to recover digested metals. A significant advance in this field was described recently (Chen, et al., "Environmentally friendly recycling and effective repairing of cathode powders from spent $LiFePO_4$ batteries" *Green Chem.*, 2016,18, 2500-2506, DOI: 10.1039/C5GC02650D) whereby cathode powders from spent $LiFePO_4$ batteries could be recycled for the first time, using a heat-treatment process. However, the recycled electroactive material required significant reprocessing to generate a new cathode structure.

Accordingly, there is a need for new electrodes which may be regenerated easily and effectively by recreation of only the cathode and provide restored capacity without cell reconstruction.

SUMMARY OF THE INVENTION

An electrode structure with active material and no binder is disclosed herein which may enable the regeneration of an electrode to regain its activity after cycle testing. After cycling of a battery with accompanying capacity fade, the electrode could be regenerated by a heat treatment process. The regeneration process may be able to restore capacity to the electrode. The capacity increase as a result of regeneration may be retained during cycling. The regenerated cathodes may deliver ~200% higher capacity than that of a control cell.

The invention relates to a binder-free, self-supporting electrode including an electrochemically active material in the absence of a binder and a current collector, wherein the electrochemically active material is a self-supporting transition metal oxide. The self-supporting transition metal oxide is selected from the group consisting of $Zn_xO_y$, $Mn_xO_y$, $V_xO_y$, $Fe_xO_y$, $Sn_xO_y$, $La_xMn_yO_z$, $Ni_xCo_yO_z$, $Mo_xO_y$, and $Mn_wNi_xCo_yO_z$, wherein x, y, and z are numbers greater than 0. Preferably, the self-supporting transition metal oxide is cryptomelane type manganese dioxide OMS-2. Furthermore, the self-supporting transition metal oxide preferably includes nanofibers. The electrode includes no more than about 20% based upon the total weight of the electrode of a conductive additive selected from the group consisting of nanostructured carbon, graphitic carbon, conductive metal nanoparticles, and metal wire mesh. Preferably, the conductive additive is nanostructured carbon and the nanostructure carbon is multi-walled carbon nanotubes, fullerene, or graphene. The preferred nanostructured carbon is multi-walled carbon nanotubes. The weight ratio of active material to conductive additive is about 5:0 or higher.

Another aspect of the invention relates to a method of regenerating a self-supporting, binder-free electrode including providing a battery with a self-supporting, binder-free electrode described above; removing the electrode from a battery with capacity fade; and regenerating the electrode by a thermal treatment under air, and placing the regenerated electrode in the battery or a new battery.

In a preferred embodiment, the battery has undergone at least 50 cycles prior to electrode regeneration. In another preferred embodiment, the battery has undergone at least 250 cycles prior to electrode regeneration.

Another aspect of the invention relates to a binder-free, self-supporting electrode consisting essentially of an electrochemically active material in the absence of a binder and a current collector, wherein the electrochemically active material is a self-supporting transition metal oxide.

DESCRIPTION OF THE DRAWINGS

FIG. 1a shows a comparison of the powder X-ray diffraction (PXRD) patterns of BFSSC with 0 and 20% w.t CNT and pwdr-OMS-2.

FIG. 1b shows digital photograph of 20% CNT containing BFSSC-20.

FIG. 1c shows four-probe resistivity measurements of BFSSCs with varying CNT content (0%, 5%, 10%, 15%, and 20%).

FIG. 2 Thermal Gravimetric Analysis (TGA) profiles of powder OMS-2 (Pwdr OMS-2), 0&20% CNT containing binder free self-supporting cathode materials, BFSSC-0 and BFSSC-20, respectively. The weight % of CNT in BFSSC-20 was calculated as 18%.

FIGs. 3a, 3b, and 3c and Table 1 show Mn 2p, Mn 3s, and O1s spectral ranges and peak positions. Binding energies (BEs) of Mn2p$_{1/2}$ and Mn2p$_{3/2}$ doublets are in the ranges of 654.1-654.3 and 642.7-642.9, respectively (FIG. 3a and Table 1).

X-ray Photoelectron spectra (XPS) of powder (Pwdr-OMS-2), 20% (BFSSC-20) and 0% (BFSSC-0) CNT containing binder free self-supporting cathode materials. FIG. 3a, Mn 2p, FIG. 3b, Mn 3s, FIG. 3c shows the O1s spectral region of OMS-2 materials. O1s peaks were deconvoluted into three different oxygen species (Mn—O—Mn, Mn—OH, and H—O—H (physisorbed water)) and the peak areas of these different oxygen species are presented in Table 1.

FIG. 4 SEM images shows as made wirelike OMS-2 materials are consist of nano-fiber bundles, FIGS. 4a and b. Upon dispersion and sonication in NMP, the bundles were opened and restacked as individual fibers as seen in the SEM images of the BFSSC surfaces (FIG. 4e). NMP (1-Methyl-2-pyrrolidone) was chosen as dispersing solvent in our studies since it can disperse both CNT and OMS-2 fibers effectively to form homogeneous and stable suspensions (41). The cross sectional SEM image of BFSSC-20 shows that the surface has a flat and smooth surface morphology along with a consistent thickness of 180 μm (FIG. 4d).

FIG. 4c Schematic diagram of broken BFSSC-20 paper material to observe side and face views, FIG. 4d is the view from side (thickness ~180 nm), FIGS. 4e and 4f are the images of the surface of BFSSC material with 5 k and 15 k magnifications, respectively.

FIG. 5a shows the cycling performance of pwdr-OMS-2, BFSSC-0, and BFSSC-20 over 100 cycles. In the figure, the capacity of pwdr-OMS-2 was calculated both per gram of cathode (solid triangle) and per gram of active material (open triangle) and capacities of BFSSCs were calculated per gram of cathode. FIGS. 5b and 5c show the representative charge and discharge curves at $1^{st}$, 10, $50^{th}$, and $100^{th}$ cycles of BFSSC-20 and pwdr-OMS-2, respectively.

FIG. 5a) Evolution of discharge capacity over 100 cycles for BFSSC-20 (solid square), BFSSC-0 (solid circle), and powder OMS-2 coating (solid triangle). The capacities were calculated based on the total cathode weight. Open triangle shows the discharge capacity of powder OMS-2 coating where the capacity was calculated per gram of active material. The cells were discharged-charged at a rate of 0.09 mA/cm2. Representative discharge profiles at cycles 1, 10, 50, and 100 were shown at FIG. 5b) for BFSSC-20 and FIG. 5c) for Powder OMS-2 coating.

FIG. 6. shows galvanostatic intermittent titration technique (GITT) conducted on cells with BFSSC cathodes. Galvanostatic Intermittent Titration Technique (GITT) plots of a) BFSSC-20 (20% CNT) and b) Powder OMS-2. 40 mA/g pulses for 10 min and 20 h rest in between the pulses. Diffusion coefficient plots of c) BFSSC-20 (20% CNT) and d) Powder OMS-2.

FIG. 7 Electrochemical impedance spectroscopy (EIS) measurements of coin cells with a) BFSSC-20 (20% CNT) and BFSSC-0 (0% CNT). The inset is the low-resistance part of BFSSC-20. b) The impedance measurements of powder OMS-2 coatings with varying coating thicknesses. c) The equivalent electrical circuit used to fit the impedance spectra FIG. 8. Capacity versus cycle number for lithium anode/BFSSC cells under galvanostatic control. The first 50 cycles were for a group of cells using as prepared electrodes. After 50 cycles, three of the cells were selected for regeneration (noted as pink, blue and red). Cycles 50 to 100 for the control cell (black) were continued as for cycles 1-50. The regenerated electrodes were reinserted into cells and the testing was continued.

FIG. 9 Morphology of OMS-2. SEM images of a OMS-2 material with different magnifications: (a) 2 kx, scale bar 10 μm. (b) 5 kx, scale bar 5 μm. (c) 10 kx, scale bar 1 μm. (d) 20 kx, scale bar 1 μm.

FIG. 10 Electrochemical Performance of BFSSCs. (a) Galvanostatic cycling performances and (b) Coulombic efficiencies of the binder free self-supporting cathode (BFSSC) cycled for 250 cycles (Control cell) and Regenerated BFSSC. BFSSC was regenerated four (4) times after 50 cycles by rinsing with DMC first and then heating under air for 2 h at 300° C. Current density was 50 mA/g (2.0 and 3.9 V vs. Li/Li$^+$).

FIG. 14 High-resolution STEM images showing crystallinity and amorphization of the pristine, 100 cycled, 300 cycled and regenerated BFSSC. (a) The pristine sample viewed along the [012] direction, revealing high crystallinity throughout the entire nanorod with a clean crystalline surface. The inset is a magnified area form the boxed region from the edge embedded with the structural model. (b) The 100-cycled sample viewed along the [015] zone axis. Although overall the nanorod remains crystalline, the fuzzy contrast and spackle intensity suggest significant amorphization on the sample. The amorphous patches appear at the edge of the image (see the inset) indicate they cover the entire surface of the nanorod. Lattice distortion related defects were also observed. (c) The 300-cycled sample. Very thick amorphous layer on surface make the atomic structure in the interior of the nanorod barely visible. (d) The regenerated sample after 150 cycles viewed along the [1-21] direction. The amorphous patches on the surface (see the enlarge image in inset from the same boxed area at the edge) has clearly transformed into a single crystal, being consistent with the x-ray and electrochemistry data.

FIG. 19 Low-magnification STEM images showing size difference of the pristine, 100 cycled, 300 cycled and regenerated BFSSC. (a) The pristine sample; (b) The 100 cycled sample; (c) the 300 cycled sample; and (d) the regenerated sample. Insets are enlarged image of the corresponding nanorods.

DETAILED DESCRIPTION

Figure 11:
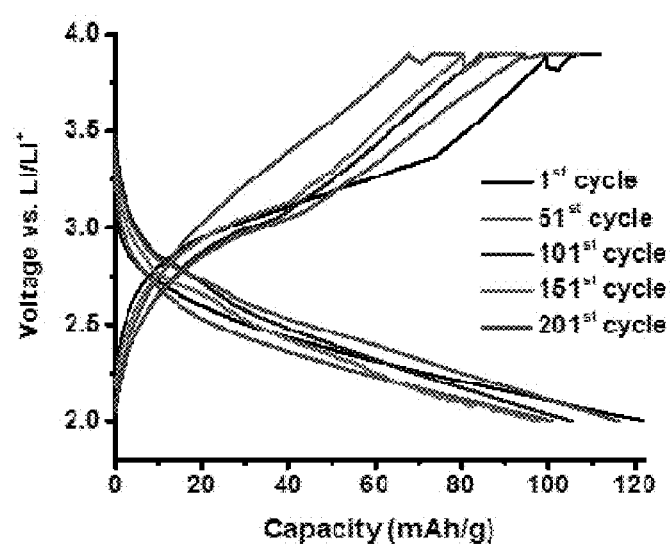
FIG. 11 Representative charge/discharge profiles of BFSSC. Initial Galvanostatic Charge/discharge profiles of regenerated BFSSC after the regeneration steps. Cycle numbers are 1, 51, 101, 151, and 201 Current density was 50 mA/g (2.0 and 3.9 V vs. Li/Li$^+$).
Figure 12:
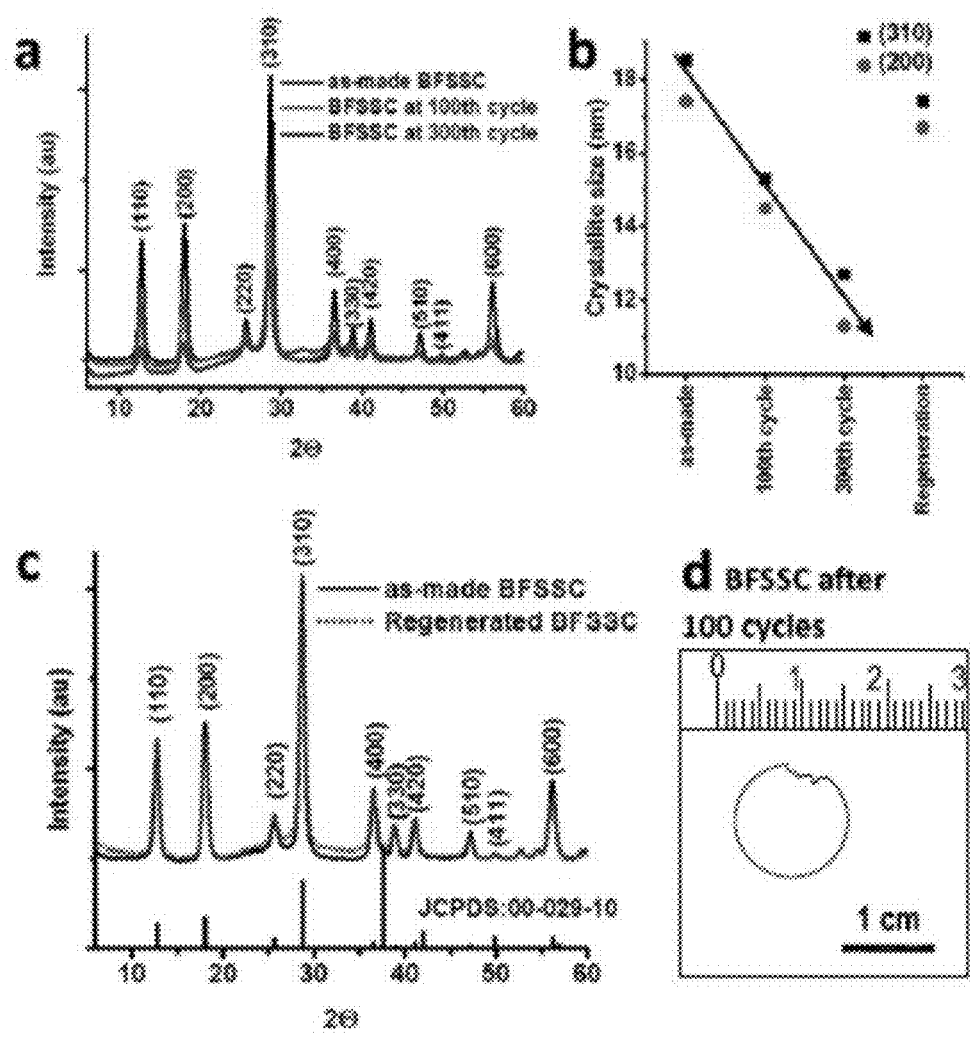
FIG. 12 Effect of Battery cycling and Regeneration on the BFSSC. (a) X-ray Diffraction (XRD) patterns of as-made BFSSC and BFSSCs galavanostatically cycled for 100 and 300 times with 50 mA/g rate. (b) Scherrer crystallite sizes of (200) and (310) planes of as-made, 100 times and 300 times cycled BFSSCs, and regenerated BFSSC after 100 cycles. (c) XRD patterns of as-made and regenerated BFSSCs. (d) Digital image of BFSSC FIG. 13 Visual and physicochemical properties of BFSSC. Digital image of a BFSSC material along with the average weight, thickness, and BET surface area. In BFSSC, OMS-2/CNT weight ratio is 5/1, corresponding to 83 wt. % of OMS-2.
Figure 15:
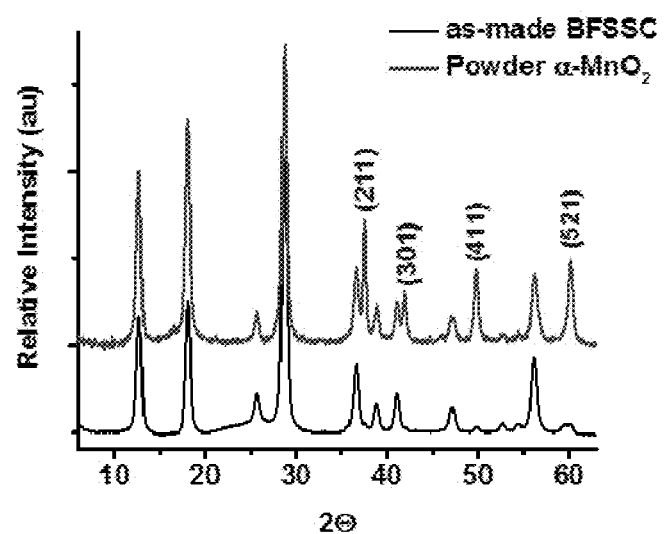
FIG. 15 Diffraction pattern comparison. X-ray Diffraction (XRD) patterns of as-made grounded OMS-2 and binder free self-supporting cathode BFSSC (83 wt. % OMS-2) materials. (K$_x$Mn$_8$O$_{16}$, JCPDS 029-1020).
Figure 16:
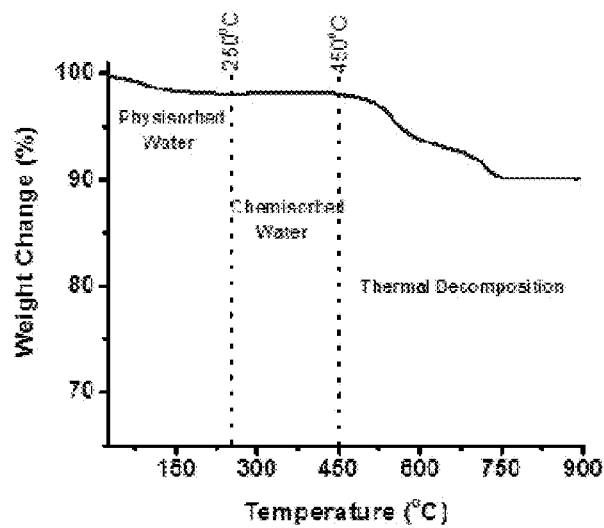
FIG. 16: Thermal stability and water content of OMS-2. Thermal Gravimetric Analysis (TGA) profile of OMS-2 (α-MnO$_2$). The TGA graph is split into three parts, separated by dashed lines, physisorbed water (RT–250° C.), Structural (Tunnel) Water (250-~450° C.), and O$_2$ evolution (thermal decomposition) (>450° C.).
Figure 17:
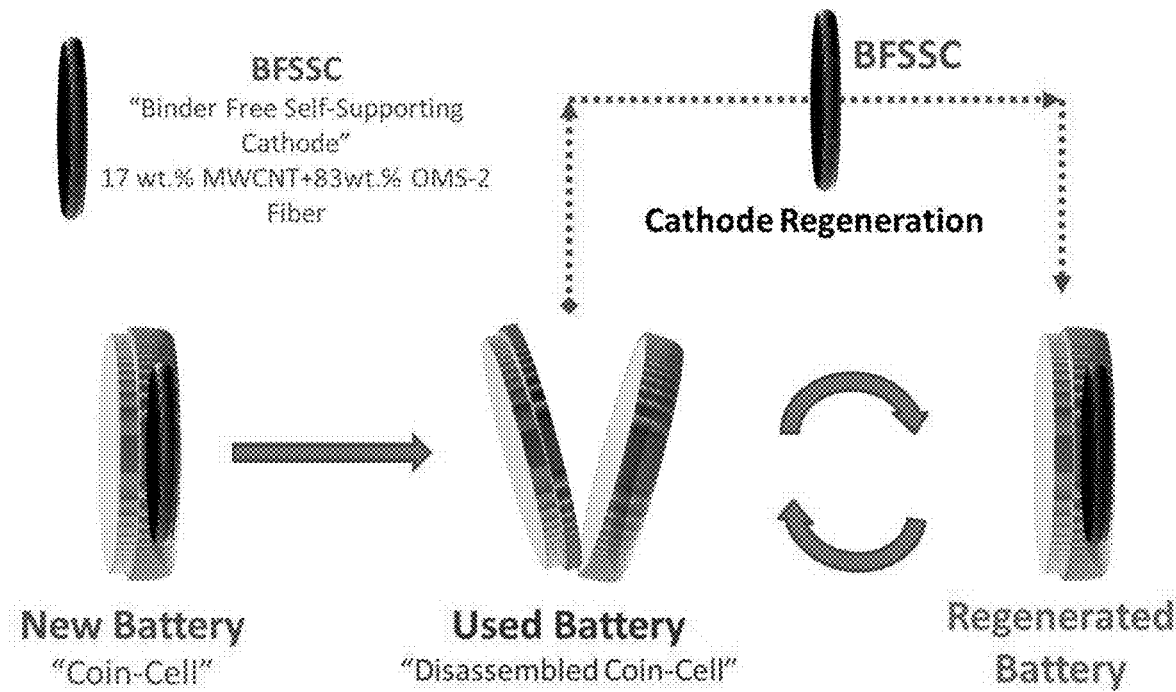
FIG. 17 Schematic representation of cathode regeneration process: (a) A coin-cell assembled with as-made BFSSC. (b) Used battery was disassembled and BFFSC was removed. (c) BFSSC was regenerated by rinsing with DMC first and then heating under air for 2 h at 300° C. (d) A new battery was assembled with the regenerated BFSSC.
Figure 18:
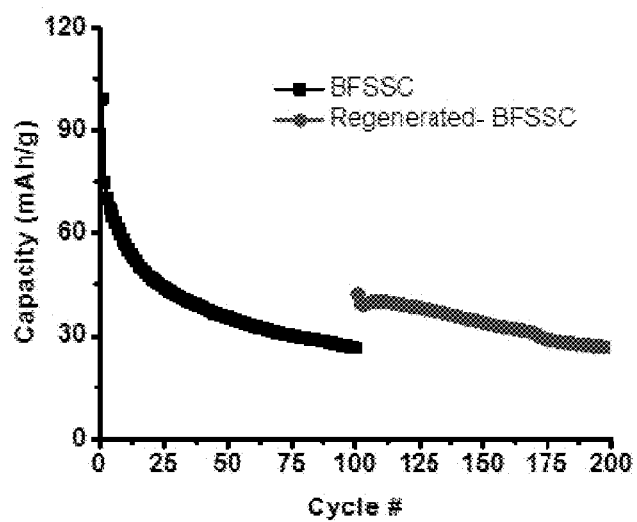
FIG. 18 Regeneration Control experiment. Galvanostatic cycling performance of BFSSC regenerated by only rinsing with DMC and dried at RT in a vacuum oven (No heating). Current density was 50 mA/g (2.0 and 3.9 V vs. Li/Li$^+$).

The present invention relates to a binder-free, self-supporting electrode including an electrochemically active material. The electrochemically active material is a self-supporting transition metal oxide. The transition metal oxide is self-supporting because of its fibrous morphology. For example, these transition metal oxides can be formulated as long, nanofibers. The long, nanofibers need no further means of support unlike conventional electrodes which are commonly deposited on carbon. In other words, the transition metal oxides of the invention differ from conventional electrodes because they do not need to be anchored, deposited, or placed on a support.

Examples of transition metals with fibrous morphologies include, but are not limited to, $Zn_xO_y$, $Mn_xO_y$, $V_xO_y$, $Fe_xO_y$, $Sn_xO_y$, $La_xMn_yO_z$, $Ni_xCo_yO_z$, $Mo_xO_y$, and $Mn_wNi_xCo_yO_z$, wherein x, y, and z are numbers greater than 0. For example, preferred transition metal oxides include ZnO, $MnO_2$, $V_2O_5$, $Fe_2O_3$, $SnO_2$, $VO_2$, $LaMnO_3$, and $NiCo_2O_4$. Most preferably, the electrochemically active material is cryptomelane type manganese oxide (OMS-2, a group of octahedral molecular sieves, $K_{x1}Mn_8O_{16}$, wherein $0.6 \geq x1 \geq 1.2$).

Binders and current collectors are also not necessary for the functioning of the electrode. Binders and current collectors for electrodes are well-known in the art. Examples of binders not necessary for the invention include, but are not limited to, polymer binders, water-based binders, and conductive binders. Examples of binders include polyvinylidene difluoride (PVDF), styrene butadiene rubber (SBR), polytetrafluoroethylene (PTFE), sodium-carboxyl-methyl-cellulose (CMC), poly (acrylaminde-co-diallyldimethylammonium) (AMAC), poly (acrylic acid) (PAA), polyaniline (PANI), polypyrrole (PPY), conducting polymer hydrogels (CPHs), Nafion, lignin, and combinations thereof. Examples of current collectors not necessary for the invention include, but are not limited to, Al and Cu foils.

The invention may optionally include conductive additives that are present for the purpose of increased conductivity, and not for structural purposes to support the electrode. In other words, the electrode is self-supporting without the required presence of a conductive additive. Additionally, the presence of a conductive additive in the electrode is minimal enough such that the conductive additive will not function as a support for the electrode. Accordingly, the quantity of conductive additives is limited to no more than about 20% based upon the total weight of the electrode in order to distinguish the additives from structural supports.

Additives to increase conductivity in an electrode are well known in the art. Some conductive additives include, but are not limited to, any graphitic carbon, nanostructured carbon, metal wire mesh, and metal nanoparticles such as Ag, Zn, Ni, and Cu. Examples of graphitic carbon include carbon black, graphite, Super P, and Kagen Black.

Nanostructured carbon includes, but is not limited to, fullerenic carbon (e.g., fullerenes and carbon nanotubes), graphenes, and polyacetylenes. Carbon nanotubes include, e.g., single-walled carbon nanotubes (SWNTs), few-walled carbon nanotubes (FWNTs), and multi-walled carbon nanotubes (MWNTs).

The term "nanostructured carbon" may exclude functionalized carbon materials, i.e., nanostructured carbon containing various functional groups incorporated in or attached to the carbon framework. The functional groups may include or exclude, for example, oxygen functional groups such as —OH and —COOH. Thus, the term "nanostructured carbon" excludes oxygen-functionalized nanostructured carbon. Types of excluded oxygen-functionalized nanostructured carbon includes materials such as, for example, oxidized FWNTs, oxidized MWNTs (including MWNT-COOH), graphene oxide (GO), reduced graphene oxide (rGO), and rGO-COOH.

Additionally, the carbon nanotubes may or may not include composites, i.e., when another element or compound is nucleated on the carbon nanotubes. For example, sulfur is not nucleated upon the carbon nanotubes, and the carbon nanotubes are not sulfur-carbon nanotube composites. Furthermore, the carbon nanostructures are not synthesized on carbon felt.

The term "nanostructured" refers to articles having at least one cross-sectional dimension on the nanometer scale, e.g., less than about 1 µm, less than about 500 nm, less than about 250 nm, less than about 100 nm, less than about 75 nm, less than about 50 nm, less than about 25 nm, less than about 10 nm, or, in some cases, less than about 1 nm. Nanostructured carbon includes materials that have features on the nanometer scale in at least one, at least two, or in all three dimensions.

The conductive additive may not be present in the invention. However, the conductive element may be present in the invention in quantities whereby it is not a structural element of the electrode, and it is present in the invention solely to increase conductivity of the electrode and electrochemical performance of the electrode in general by decreasing the charge polarization.

For example, the conductive additive may be present in the invention in minimum amount of about 0%, 0.1%, 0.5%, 1%, 2%, 3%, 4%, 5%, 6%, 7%, 8%, 9%, 10%, 11%, 12%, 13%, 14%, 15%, 16%, 17%, 18%, or 19% based upon the total weight of the electrode. Likewise, the conductive additive may be present in the invention in a maximum amount of about 20%, 19%, 18%, 17%, 16%, 15%, 14%, 13%, 12%, 11%, 10%, 9%, 8%, 7%, 6%, 5%, 4%, 3%, 2%, or 1% based upon the total weight of the electrode. Each of the above-listed minima and maxima may be combined to create a range. For example, the conductive additive may be a carbon nanotube present in a minimum amount of about 9% and a maximum amount of about 20%.

In a preferred aspect of the invention, the transition metal oxide is OMS-2 and a conductive additive such as multi-walled carbon nanotube is present in a preferred ratio of about 5:0 or higher, OMS-2 to multi-walled carbon nanotube.

In another preferred aspect of the invention, no conductive additive is present.

Another embodiment of the invention relates to a binder-free, self-supporting electrode consisting essentially of an electrochemically active material in the absence of a binder and a current collector, wherein the electrochemically active material is a self-supporting transition metal oxide. The term "consisting essentially of" would exclude the presence any additive included in the electrode in quantities such that the additive would function as a structural element. The electrode is self-supporting exclusively because of the fibrous morphology of the translation metal oxide. Conductive additives such as any carbon form may be present in this embodiment of the invention, but they are not present in quantities to be considered structural elements. In other words, "consisting essentially of" would include the presence of up to about 20% by total weight of the electrode of a conductive additive according to the invention.

In another embodiment, the invention relates to a binder-free, self-supporting electrode consisting of cryptomelane type manganese dioxide OMS-2 nanofibers and a nanostructured carbon. The nanostructured carbon may be present in a maximum amount of about 20% of the total composition and a minimum amount of 0% of the total composition.

The invention also relates to a method of recycling the electrodes described above. The electrode of the invention may be regenerated by thermal treatment so it can be placed in a new battery and re-used. Regenerated electrodes display restored crystallinity and oxidation state of the transition metal centers with resulting electrochemistry (capacity and coulombic efficiency) similar to that of freshly prepared electrodes.

After a battery containing the electrode of the invention had undergone a significant number of cycles and the capacity had faded, the electrode may be regenerated by removing it from the old battery and rinsing, if necessary, to remove, for example, lithium salt from the electrode surface. Any organic solvent can be used to rinse the battery that can dissolve lithium salt, e.g., DMC (dimethyl carbonate), DEC (diethyl carbonate), EMC (ethyl methyl carbonate), EA (ethyl acetate), MB (methyl butyrate), EB (ethyl butyrate), DMM (dimethoxymethane), DME (dimethoxyethane), and THF (tetrahydrofuran), etc. The electrode is then placed in an oven heated to a temperature high enough so that the transition metal oxide is fully oxidized and low enough so that the electrode is not subject to thermal decomposition. The temperature and duration of the regeneration with respect to a given electrode can be determined by a person having ordinary skill. For example, for an OMS-2/MWNT electrode, regeneration may take place in a 300° C. oven for approximately 2 hours.

After the electrode is thermally regenerated, the regenerated electrode may be placed in the same battery or in a new battery. The number of discharge-charge cycles before regeneration may be determined by monitoring the performance of the battery to determine capacity fade.

The number of cycles may be anywhere between from about 50 to a number of cycles even greater than about 250.

The invention may be practiced in the absence of any element which is not specifically disclosed herein.

Examples have been set forth below for the purpose of illustration and to describe the best mode of the invention at the present time. The scope of the invention is not to be in any way limited by the examples set forth herein.

EXAMPLES

Example 1. Materials Characterization

Potassium containing cryptomelane type OMS (OMS-2) fibers were synthesized by the redox reaction between $Mn^{2+}$ and $S_2O_8^{2-}$ under hydrothermal conditions. Binder-free self-supporting cathode (BFSSC) materials were prepared by dispersing the fibers with varying amounts of multiwall carbon nanotube (CNT) in NMP and filtering through a glass membrane. For comparison, as made OMS-2 fibers were grounded to fine powder and labeled as Pwdr-OMS-2. FIG. 1a shows the X-ray diffraction (XRD) patterns of BFSSC with 0 and 20% w.t CNT and pwdr-OMS-2. Diffractions lines of both BFSSC and pwdr-OMS-2 are in agreement with the tetragonal cryptomelane phase (JCPDS file number 29-1020) with substantially no detected impurities. One difference between BFSSCs and pwdr-OMS-2 (and the standard pattern) may be the higher relative intensities of (hk0) diffraction lines compared to (001) lines. The (hk0) crystallographic planes may be parallel to the 2×2 tunnels. Therefore, higher intensities of (hk0) lines are may be related to preferential orientation of the nanofibers in a certain crystal growth direction (c-axis). Yuan et al. also reported particular orientations for paper-like OMS-2 fibers and OMS-2 tetragonal prisms both prepared with similar hydrothermal methods. Regardless of the CNT content BFSSCs show substantially pure tetragonal cryptomelane phase with I4/m space group.

The structural purity of the BFSSC and pwdr-OMS-2 samples was confirmed by Raman spectroscopy. Raman spectroscopy may be sensitive for the detection of impurity phases (i.e. MnOOH, $Mn_2O_3$, $Mn_3O_4$), phase evaluation, and tunnel cation occupancy of OMS-2 materials. The Raman spectra of BFSSCs feature four strong bands located at 185, 391, 582, and 640 $cm^{-1}$ and a weak one at 332 $cm^{-1}$. The detected bands were assigned to substantially pure crystalline cryptomelane phase of manganese dioxide. The strong bands at 582 and 640 $cm^{-1}$ may be due to symmetrical Mn—O stretching in a tetragonal structure with an interstitial space consisting of 2×2 tunnels (21). The low-frequency Raman band at 185 $cm^{-1}$ may be assigned to the external vibration that derives from the translational motion of the octahedral $MnO_6$ units and the band at 391 $cm^{-1}$ is ascribed to the Mn—O bending vibrations.

BFSSC cathodes were prepared by punching out circular pieces from OMS-2 membranes with a diameter of ½". FIG. 1b shows digital photograph of 20% CNT containing BFSSC-20. The average thickness and weight of BFSSC-20 are 0.172±0.012 mm and 12.1±1.0 mg, respectively. The measured thicknesses and weights are found to be very consistent for all BFSSCs. Four-probe resistivity measurements of BFSSCs with varying CNT content are presented in FIG. 1c. In the lack of CNT (BFSSC-0), the resistivity was found to be 38.4±1.1 Ωcm which is similar to the previously reported resistivity values for OMS-2 materials. The resistivity values decreased constantly with increasing CNT content and reached to 0.067±0.003 Ωcm at a CNT content of 20% (BFSSC-20). BET surface areas of pwdr-OMS-2 (58.0 $m^2/g$) and BFSSC-20 (65.2 $m^2/g$) are found to be close suggesting that there may be no-change at the surface textural properties upon processing of OMS-2 fibers to form OMS-2 membranes.

Thermal gravimetric analyses (TGA) of OMS-2 materials were performed under air flow to determine the amounts of structural (tunnel) water, thermal stabilities, and the CNT content (FIG. 2). The weight loss profiles of OMS-2 materials can be separated in three parts. (i) In the RT-250° C. range, weight loss is attributed to physisorbed water. The weight loss of BFSSCs and pwdr-OMS-2 were around 1.8-2.0%. (ii) In the 250-450° C. range, the weight loss may be due to the loss of structural (tunnel) water. The weight loss of pwdr-OMS-2 and BFSSC-0 were the same (~1%) corresponding to ~0.25 units of water per molecular formula, $K_xMn_8O_{16}$. In the same range, 20% CNT containing BFSSC-20 showed larger weight loss, 6%. Notwithstanding any particular theory it may be the thermal decomposition of CNT in BFSSC-20 cathode in the range. The TGA profile of pure CNT shows an offset temperature of 450° C. The CNT decomposition may be promoted to occur at slightly lower temperatures on the redox active labile oxygen on the OMS-2 surface. (iii) At temperatures higher than 450° C., lattice oxygen evaluates from the structure and manganese dioxide decomposes ($MnO_2 \rightarrow Mn_2O_3 \rightarrow Mn_3O_4$)(25, 29). BFSSC-0 and pwdr-OMS-2 show two-step decomposition above 450° C. The steps of pwdr-OMS-2 are at lower temperatures (~500 & 700° C.) compared to BFSSC-0 (~590 & 860° C.). The actual CNT content of BFSSC-20 was found to be 18% (21% w.r.t. weight of OMS-2) from the difference between the percent weight changes of BFSSC-0 and BFSSC-20 at 750° C.

X-ray photoelectron spectroscopy (XPS) was employed in order to investigate surface chemical composition and average manganese oxidation state. Survey spectra of pwdr-OMS-2, BFSSC-0, and BFSSC-20 were collected. The survey spectra show the characteristic core level photoelectron peaks of Mn2p, Mn3s, Mn3p, K2s, K2p and O1s and Auger signals of Mn and O with no surface impurities. FIG. 3 and Table 1 show Mn 2p, Mn 3s, and O1s spectral ranges and peak positions. Binding energies (BEs) of $Mn2p_{1/2}$ and $Mn2p_{3/2}$ doublets are in the ranges of 654.1-654.3 and 642.7-642.9, respectively (FIG. 3a and Table 1). These values are consistent with the previously reported manganese dioxide Mn2p values ruling out the presence of other lower valance manganese oxide phases (i.e. MnO, $Mn_3O_4$, and $Mn_2O_3$).

AOSs. AOS of Pwdr-OMS-2 was calculated to be 3.75. However, BFSSC-20 and BFSSC-0 demonstrated slightly higher oxidation states 3.84 and 3.85, respectively. The calculated oxidation states indicate mixed-valent nature of manganese in OMS-2 materials.

FIG. 3c shows the O1s spectral region of OMS-2 materials. O1s peaks were deconvoluted into three different oxygen species and the peak areas of these different oxygen species are presented in Table 1. The oxygen species correspond to oxygen bounded to manganese (Mn—O—Mn) at 529.87-580.08 eV, surface hydroxyls (Mn—O—H) at 531.66-531.80 eV, and surface adsorbed water (H—O—H) at 533.17-533.45 eV (14, 31, 39). Relative peak area comparison suggests that the most of the oxygen is in the form of lattice oxygen bounded to manganese (Mn—O—Mn). In addition, pwdr-OMS sample has relatively lower hydroxyl content (11.1%) suggesting a more defect-free structure or breakage of Mn—O—Mn to form hydroxyl groups upon processing the nano-wires to obtain BFSSCs (39, 40).

As made wire-like OMS-2 materials consist of nano-fiber bundles, FIGS. 4a and b. Upon dispersion and sonication in NMP, the bundles were opened and restacked as individual fibers as seen in the SEM images of the BFSSC surfaces (FIG. 4e). NMP (1-Methyl-2-pyrrolidone) was chosen as dispersing solvent in these studies since it can disperse both CNT and OMS-2 fibers effectively to form homogeneous and stable suspensions (41). The cross sectional SEM image of BFSSC-20 shows that the surface has a flat and smooth surface morphology along with a consistent thickness of 180

TABLE 1

The summary of XPS data of OMS-2 powder and BFSSC Materials

| | Mn 2p (eV) | | Mn 3s (eV) | | | | O1s | | Average Oxidation |
| --- | --- | --- | --- | --- | --- | --- | --- | --- | --- |
| Sample | $2p_{1/2}$ | $2p_{3/2}$ | $BE_1{}^a$ | $BE_2{}^a$ | $\Delta E^b$ | State$^c$ | BE (eV) | Area (%) | State$^d$ |
| Powder OMS-2 | 654.2 | 642.7 | 89.17 | 84.55 | 4.62 | Mn—O—Mn | 529.87 | 86.9 | 3.75 |
| | | | | | | Mn—O—H | 531.66 | 11.1 | |
| | | | | | | H—O—H | 533.17 | 2.0 | |
| BFSSC-20% CNT | 654.3 | 642.9 | 89.16 | 84.62 | 4.54 | Mn—O—Mn | 530.08 | 78.3 | 3.84 |
| | | | | | | Mn—O—H | 531.80 | 16.9 | |
| | | | | | | H—O—H | 533.45 | 4.8 | |
| BFSSC-0% CNT | 654.1 | 642.7 | 89.06 | 84.51 | 4.55 | Mn—O—Mn | 529.76 | 73.2 | 3.83 |
| | | | | | | Mn—O—H | 531.69 | 25.8 | |
| | | | | | | H—O—H | 533.24 | 1.0 | |

$^a$Binding energies of two chemical states were obtained for Mn3s photoelectrons,
$^b\Delta E = BE_1 - BE_2$ of Mn3s photoelectrons,
$^c$three different chemical states of O as indicated, were obtained from O1s spectral region, and
$^d$Average oxidation states (AOS) were calculated from the $\Delta E$ of Mn3s peaks (AOS = 8.956 − 1.126 × $\Delta E_{(3s)}$).

XPS has been widely used for the determination of the average oxidation state (AOS) of manganese oxide compounds (14, 31, 32, 34-37). Despite oxidation state calculations were reported using Mn2p and O1s spectral regions, calculations using the splitting between Mn3s main and satellite peaks ($\Delta E_{Mn3s0}$) is the prominence and widely confirmed method. The splitting originates from the exchange coupling between 3s hole and 3d electrons and proportional to (2S+1), where S is the spins of 3d ground state electron configuration. In other words, lower oxidation states of high spin manganese center causes a bigger splitting between M3s man and satellite peaks. Galakhov et al. reported first time a linear correlation between the $\Delta E_{Mn3a}$ and AOS (AOS=8.956−1.126×$\Delta E_{Mn3s}$), except the $3.0^+$-$3.3^+$ manganese formal valance range (32, 35, 36). FIG. 3b shows the Mn3s spectral region and Table 1 shows the calculated μm (FIG. 4d). EDS mapping was also used to evaluate the dispersion of CNT in the BFSSC-20. Carbon-mapping indicates homogeneous carbon dispersion throughout the BFSSC surface. However, SEM images of grounded pwdr-OMS-2 may be different than the as-made OMS-2 wirelike material. Upon physical grounding, the morphology may change to micron sized agglomerates formed by shortened nano-fibers.

Example 2. Electrochemical Characterization of BFSSCs

Electrochemical performance of BFSSCs as cathodes in lithium ion batteries was investigated via galvanostatic charge-discharge tests. For the tests, experimental coin cells were assembled using BFFSCs directly. For comparison, a prior art composite coating on aluminum foil was prepared from pwdr-OMS-2 sample. The cells were charged/discharged in a voltage range of 2.0-3.9 V and at two different current densities; 0.09 mA/cm$^2$ (FIG. 5) and 0.45 mA/cm$^2$. FIG. 5a shows the cycling performance of pwdr-OMS-2, BFSSC-0, and BFSSC-20 over 100 cycles. In the figure, the capacity of pwdr-OMS-2 was calculated both per gram of cathode (solid triangle) and per gram of active material (open triangle) and capacities of BFSSCs were calculated per gram of cathode. The discharge capacities of BFSSC-20, BFSSC-0, and pwdr-OMS-2 are 107, 62, and 35 mAh/g at initial discharge and 53, 20, and 10 mAh/g at 100$^{th}$ cycle, respectively. BFSSC-20 showed the highest gravimetric capacities throughout the test, maintaining >50 mAh/g after 100 cycles. Lower capacities of BFSSC-0 are attributed to the high resistivity of the cathode due to the lack of conductive additive (see FIG. 1c). Significantly lower capacities of pwdr-OMS-2 can be explained by the electrochemically inactive components of the composite coating (Aluminum, binder, and CNT). The amount of active material (pwdr-OMS-2) in the coating is ~25% by weight which decreases the gravimetric capacity of the cathode. In order to realize the real potential of BFSSCs the capacity of the pwdr-OMS-2 coating was also calculated using the amount of active material (FIG. 5a). The results are similar to the one of BFSSC-20 except slightly higher discharge capacities in the first ~40 cycles. The discharge capacities of Pwdr-OMS-2 per grams of active material were 139 mAh/g at 1$^{st}$ cycle, which decreased to 55 mAh/g at 50$^{th}$ cycle and to 40 mAh/g at 100$^{th}$ cycle. Based on electrode weight, the present BFSSC electrodes showed higher capacity relative to the prior art Pwdr-OMS-2 electrodes.

One trend at the discharge capacity vs. cycle number plots is the decreases at the capacities at initial cycle(s) (FIG. 5a). Later, the capacity gradually continues to decrease but with a smaller rate. For example, the initial discharge capacity of BFSSC-20 decreased by 30% (107 to 76 mAh/g) in the first 10 cycles, the decrease in the next 40 cycles was 22% (76 to 56 mAh/g), and in the last 50 cycles the decrease was 3% (56 to 53 mAh/g). FIGS. 5b and 5c show the representative charge and discharge curves at 1$^{st}$, 10, 50$^{th}$, and 100$^{th}$ cycles of BFSSC-20 and pwdr-OMS-2, respectively. The discharge-charge profiles are found to have similar characteristics except the gravimetric capacities. The initial discharge curves show a step wise potential variation with no-obvious plateau. The first shoulder (step) is around 2.7 V and the second one is around 2.5 V vs. Li/Li$^+$. Both shoulders gradually fade after consecutive cycling and adopted a single slope profile suggesting a single-phase insertion electrode (42). Similar discharge profiles for OMS-2 ($\alpha$-MnO$_2$) materials were observed previously for the materials synthesized by hydrothermal methods (43-45). Surface area, crystallinity, tunnel occupation, doping, and morphology are found to be other important factors affecting the recyclability and discharge profiles of OMS-2 ($\alpha$-MnO$_2$) materials.

Galvanostatic intermittent titration technique (GITT) was conducted on cells with BFSSC cathodes, FIG. 6. The diffusion coefficients for the cathodes with and without CNTs were determined, FIGS. 6c and 6d. Additionally, electrochemical impedance spectroscopy was utilized to characterize the samples with and without the added CNTs, FIG. 7. The impedance of the sample with CNT is lower than that of pure OMS-2. Additionally, the impedance is related to the thickness of the electrode where the thicker electrode shows higher impedance, FIG. 7b.

Example 3. Regeneration of Electrode

The regeneration of electrodes was conducted in order to restore the behavior of the cell. The electrodes were removed from the cells after the capacity had decreased from the initial cell capacity after cycling. The electrodes were heat treated at 200, 300 or 350° C. under air. The same electrodes were reinserted into active electrochemical cells and cell testing was resumed, FIG. 8.

Prior to regeneration, the delivered capacities from the cells were below 60 mAh/g. After heat treatment the cell capacities were above 100 mAh/g. In particular, as the cells resumed cycle testing under constant current, the capacity of the regenerated electrodes remained at a high level. The control cell had a delivered capacity of ~30 mAh/g while the regenerated cells had delivered capacities of ~60-70 mAh/g, 2× that of the control cell.

Thus, the regeneration process may be able to restore capacity to the electrode. The capacity increase as a result of regeneration may be retained during cycling. The regenerated cathodes may delivered ~200% higher capacity than that of the control cell.

Example 4

Preliminary results: i) M$_x$Mn$_8$O$_{16}$ (M=K$^+$, Ag$^+$) material synthesis and characterization demonstrating control of particle size, crystallite size, and covalent character.

The inventors have been successful in the synthesis of M$_x$Mn$_8$O$_{16}$ (M=K$^+$, Ag$^+$) materials by a variety of methods allowing control of composition (M/Mn ratio), physical properties (surface area, morphology) and crystallite size. Specifically, Ag$_x$Mn$_8$O$_{16}$ was prepared by an ambient pressure reflux method and K$_x$Mn$_8$O$_{16}$ Cryptomelane type manganese dioxides (OMS-2) were synthesized using three different methods, low-temperature hydrothermal (HT-OMS-2), reflux (RF-OMS-2), and solvent-free (SF-OMS-2. (75-78)

For the synthesis of HT-OMS-2, manganese sulfate monohydrate (Mn(SO$_4$).H$_2$O), potassium sulfate (K$_2$SO$_4$), potassium persulfate (K$_2$S$_2$O$_8$), and water were heated in an autoclave. RF-OMS-2 was prepared by heating potassium permanganate (KMnO$_4$) and manganese sulfate monohydrate (MnSO$_4$.H$_2$O) with nitric acid (HNO$_3$) at reflux. For the synthesis of SF-OMS-2, manganese acetate tetrahydrate (Mn(Ac)$_2$.4H$_2$O) and potassium permanganate (KMnO$_4$) were heated at 120° C. Structural formulas for OMS-2 materials were assigned from XRD, ICP-OES (K$^+$ content), TGA (water content), and XPS (AOS) results. Among all, RF-OMS-2, K$_{0.81}$Mn$_8$O$_{15.9}$.1.06H$_2$O, had the lowest amount of oxygen defects and highest oxidation state.

In the case of Ag$_x$Mn$_8$O$_{16}$, the silver content can be systematically modified through synthetic control leading to a concomitant shift in crystallite size. A recent study of large crystallite, high silver (H—Ag-MOS-2) content material versus small crystallite, low silver content (L-Ag-OMS-2) material demonstrated significant differences in structure, defects and size impacting electrochemical performance.

The cations residing in tunnels of the manganese dioxides balance the charge of manganese; therefore the average oxidation state of manganese is lower for the materials with higher amounts of cation (81-85). The high silver H—Ag-OMS-2 material shows less angular distortion in the MnO$_6$ octahedral structure but more Mn—O bond-length variation. The L-Ag-OMS-2 sample shows a larger value of 9.770 for the a and b dimension compared to 9.738 Å for the high silver sample, H—Ag-OMS-2. Prior studies on hollandite manganese oxide tunnel structures have shown that Group I metal cations (including K$^+$) increase the dimensions of the 2×2 tunnels where higher occupancies of the tunnel ions increase the lattice parameters. (86) In contrast, the results for silver ions show that higher occupancy of silver decreases the a and b lattice parameters as the silver content of x=1.8 has a tunnel dimension of 4.873 Å in the ab plane. (87) As the silver content decreases to x=1.66 (H—Ag-OMS-2) and 1.22 (L-Ag-OMS-2), the tunnel dimensions increase to 5.072 and 5.176 Å, respectively. Thus, the trend observed at all three silver levels indicates decreased lattice parameters with increasing silver content likely related to more covalent bonding character of the silver ion compared to Group I metal ions.

Comparative electrochemical data in magnesium based electrolyte was obtained for the M=Ag or K for $M_xMn_8O_{16}$ samples. The potassium based sample showed improved capacity retention over the silver containing sample.

Example 5

Preliminary results: ii.) a robust, self-supporting, regenerable positive electrode.

A novel cathode structure that is binder free self-supporting (BFSSC) was developed where the active catalyst (OMS-2) is the structural element of the electrodes. OMS-2 nanowires used for this study were prepared by a hydrothermal method to form long nanowires (>10 μm) grouped in bundles. The chemical formula of $K_{0.84}Mn_8O_{16} \cdot 0.25H_2O$ was assigned based on analysis of the material. Multiwall carbon nanotubes (MWNT) can be added in various ratios to enhance electrical conductivity. Mixed valent (+3/+4) OMS-2 ($\alpha$-$MnO_2$) have been previously used as redox catalysts for selective or total oxidation of organic compounds. As a heterogeneous catalyst, the activity of OMS-2 decreases due to the depletion of labile surface oxygens, surface adsorbed species blocking the active sites, or/and reduction of manganese. OMS-2 catalysts can be regenerated by washing or/and heating under oxidative atmospheres such as air (94, 100-104). Upon regeneration, the oxidation state of manganese is restored and the surface of the catalyst is repaired (94, 96, 100, 102). Manganese oxides, when used as cathodes, experience similar irreversible manganese reduction ($Mn^{4+} \rightarrow Mn^{3+} \rightarrow Mn^{2+}$), amorphization, crystal structure change, and cathode dissolution (analogue of catalyst leaching).

In the cathode regeneration process, the cycled cathode was removed from the battery, regenerated by a simple thermal treatment under air and reused. The electrochemical performance of BFSSC recovered after regeneration. The initial capacity for both cell types was ~115 mAh/g. After the first 50 cycles the capacity degraded to 43 mAh/g. After regeneration, the capacity of the cell was restored to 101 mAh/g. The process was repeated multiple (four) times with recovery of performance each time. The delivered capacities were almost totally restored after each of the regeneration steps. The initial capacities after regeneration were all higher than 95 mAh/g suggesting an almost full recovery of the cathode performance. At the end of 250 cycles, the regenerated BFSSC delivered 60 mAh/g capacity, almost five (5) times higher than the BFSSC control cell (13 vs. 60 mAh/g). The effect of the regeneration on the coulombic efficiencies was also encouraging.

XPS—the relative amounts of lattice oxygen ($O_{lat}$) content on the surface increased from 45.5 to 67.9% after cathode regeneration. It appears that high temperature regeneration (at 300° C.) under an oxidative atmosphere (air) may promote reoxidation and condensation of the manganese oxide structure in the cycled BFSSC.

TABLE 2

XPS summary of as-made, cycled, and regenerated BFSSCs

| Sample | Mn 2p (eV) | | Mn 3s (eV) | | | State[c] | O1s | | Average Oxidation State[d] |
|---|---|---|---|---|---|---|---|---|---|
| | $2p_{1/2}$ | $2p_{3/2}$ | $BE_1{}^a$ | $BE_2{}^a$ | $\Delta E^b$ | | BE (eV) | Area (%) | |
| As-made BFSSC | 653.7 | 642.4 | 88.54 | 83.99 | 4.55 | $O_{lat}$ | 529.2 | 78.1 | 3.83 |
| | | | | | | $O_{surf}$ | 530.7 | 12.0 | |
| | | | | | | $O_{ads}$ | 532.0 | 9.9 | |
| BFSSC@100th cycle | 653.1 | 641.6 | 88.95 | 83.83 | 5.12 | $O_{lat}$ | 529.1 | 45.5 | 3.20 |
| | | | | | | $O_{surf}$ | 530.5 | 51.9 | |
| | | | | | | $O_{ads}$ | 533.7 | 2.6 | |
| BFSSC@300th cycle | 653.1 | 641.5 | 89.14 | 83.35 | 5.79 | $O_{lat}$ | 529.3 | 12.4 | 2.43 |
| | | | | | | $O_{surf}$ | 531.0 | 67.3 | |
| | | | | | | $O_{ads}$ | 533.7 | 20.3 | |
| Regenerated BFSSC | 653.5 | 641.9 | 88.49 | 83.91 | 4.58 | $O_{lat}$ | 529.3 | 67.9 | 3.79 |
| | | | | | | $O_{surf}$ | 530.8 | 22.5 | |
| | | | | | | $O_{ads}$ | 532.4 | 9.6 | |

[a]Binding energies of two chemical states were obtained for Mn3s photoelectrons,
[b]$\Delta E = BE_1 - BE_2$ of Mn3s photoelectrons,
[c]three different chemical states of O as indicated, were obtained from O1s spectral region, and
[d]Average oxidation states (AOS) were calculated from the $\Delta E$ of Mn3s peaks (AOS = $8.956 - 1.126 \times \Delta E_{(3s)}$).

Example 6. Materials Synthesis

Cryptomelane type manganese dioxide nanowire, octahedral molecular sieve (OMS-2), was synthesized by a hydrothermal method, previously reported by Yuan et al. (13). In a typical synthesis of OMS-2, 3 mmol (0.51 g) of manganese sulfate monohydrate ($Mn(SO_4) \cdot H_2O$), 3 mmol (0.52 g) of potassium sulfate ($K_2SO_4$), 6 mmol (1.62 g) of potassium persulfate ($K_2S_2O_8$), and 10 ml of DDI water were added and stirred in a Teflon vessel for 30 min at RT. The ratio of reactants was 1:2:1:555.6. Later, the vessel was transferred to a stainless steel autoclave and placed in an oven running at 200° C. for 48 h. The resulting solid was washed several times with DDI water, filtered, and dried in a vacuum oven running at 60° C. overnight. The dried solid material was grinded in a mortar to obtain fine powder. The powder sample labeled as Powder-OMS-2.

Example 7. Electrode Fabrication—State of the Art Electrodes

As comparative controls to the present BFSSC materials, composite cathodes were prepared on an aluminum foil (current collector) by mixing conductive multiwall carbon nanotube (15 wt. %), powder OMS-2 (70 wt. %), and Polyvinylidene fluoride (PVDF) binder (15 wt. %). The thickness of the coating was adjusted using doctor's blade. The circular composite cathodes were made at three different thicknesses (0.008, 0.015, and 0.025 mm) and with the area of 1.27 cm$^2$. The composite cathodes were named as Pwdr OMS-2-X, where X is the cathode thickness.

Example 8. Electrode Fabrication—Novel Binder Free Self-Supporting Cathode (BFSSC)

Materials
As-made OMS-2 material (~270 mg) was dispersed in 300 mL of DDI water and stirred overnight. The suspension was allowed to rest for a period of time and supernatant solution was decanted. The process was repeated 6 more times (with 1 h stirring time) with 250 mL portions of water (2×), acetone (2×), and 1-Methyl-2-pyrrolidone (NMP) (2×), respectively. The resulting suspension, OMS-2 nanowires dispersed in ~50 mL of NMP, was further sonicated for 1 h and then added to an another suspension containing various amounts of multiwall carbon nanotube (CNT) in 100 mL of NMP (total volume is ~150 mL) and sonicated together for an additional one hour. The amounts of CNT in the final suspension were adjusted such a way that the weight percent amounts of CNT (w.r.t. OMS-2) were 0, 5, 10, 15, and 20%. Later, the suspensions were filtered through a glass frit Buchner funnel and wash with NMP and ethanol and dried in a vacuum oven over night. The formed OMS-2 membrane was peeled off and pressed with a hydraulic hand press at 6 tons for 90 seconds to obtain a good electrical contact. Circular pieces with ½" diameter (1.27 cm$^2$) were punched out to obtain binder free self-supporting cathodes (BFSSC). The BFSSC cathodes were named as BFSSC-X where X is the % CNT content, X=0, 5, 10, 15, or 20.

Example 9. Materials Characterization

X-ray diffraction (XRD) patterns of BFSSC and powder OMS-2 samples were collected with a Rigaku Ultima IV X-ray diffractometer. Cu Kα radiation (λ=1.5406 A) was used with Bragg-Brentano focusing geometry. $N_2$ sorption (adsorption-desorption) measurements were performed on a Micrometrics Tristar II 3020 and multipoint BET (Brunauer, Emmett, and Teller) method was used for calculating the surface area. Thermogravimetric analysis (TGA) was performed with a TA instruments SDT Q600 instrument under 10 cc/min air flow and in the temperature range of 25-900° C. Inductively coupled plasma optical emission spectroscopy (ICP-OES) was done using with a Thermo Scientific iCAP 6000 series spectrometer to determine the elemental composition. The samples were digested in 50 wt. % nitric acid and hydrogen peroxide $H_2O_2$ for ICP-OES measurements. The conductivity of BFSSC samples were measured by a standard linear four-point probe arrangement. Scanning electron microscopy (SEM) images and energy dispersive spectra (EDS) of the OMS-2 samples were collected using JEOL JSM-6010PLUS instrument with the accelerating voltage of 20 kV. X-ray photoelectron spectroscopy (XPS) experiments were carried out in a UHV chamber equipped with SPECS Phoibos 100 MCD analyzer and a non-monochromatized Al-Kα X-ray source (hv=1486.6 eV) operating with an accelerating voltage of 10 kV and 30 mA current. The chamber typically has a base pressure of 2×10-10 Torr. The powder samples were pressed onto a conductive copper tape and mounted on a sample holder. Charging effects were corrected by adjusting the binding energy of C (1s) peak at 284.8 eV (14). Raman spectra were collected using Horiba Scientific Xplora Raman Spectrometer with 1% laser power (λ=532 nm) to prevent thermal excitations and 50× optical lens.

Example 10. Electrochemical Characterization

Stainless steel experimental type coin cells with lithium metal anodes were fabricated in an argon atmosphere glove box. Cathodes (BFSSCs or coatings) of OMS-2 type manganese oxides, Tonen E25 separator, lithium metal, and electrolyte consisting of 1 M LiPF6 in ethylene carbonate-dimethylcarbonate (30:70 wt.ratio) were employed in the cells. Electrochemical impedance spectroscopy (EIS) was measured over the frequency range of 10 mHz-100 kHz at 30° C. Analysis of the AC impedance measurements was conducted using the ZView® software from Scribner Associates, Version 3.4c to obtain the solution/ohmic and charge transfer resistances. Warburg coefficients were calculated from the slope of Z' vs. W—½ (angular) plot (15). Galvanostatic intermittent titration technique (GITT) type testing was conducted with intermittent discharge current of 40 mA/g for 10 min followed by open circuit rest for 20 h. Cell discharge/charge tests were performed at 37° C. using a Maccor multichannel testing system under the rates of 0.09 and 0.45 mA/cm$^2$ and in the voltage range of 2.0 to 3.9 V.

TABLE 3

The summary of EIS parameters and diffusion coefficients

| Sample | $R_s^a$ (Ω) | $R_{CT}^b$ (Ω) | $\sigma_W^c$ (Ωs$^{-1}$) | $D_{Li^+}^d$ (cm$^2$/s) |
|---|---|---|---|---|
| Pwdr OMS-2$^e$ (0.008 mm) | 2.3 | 127 | 0.17 | NA |
| Pwdr OMS-2$^e$ (0.015 mm) | 2.3 | 198 | 0.78 | NA |
| Pwdr OMS-2$^e$ (0.025 mm) | 3.4 | 322 | 0.78 | 1.11*10$^{-8}$-1.48*10$^{-10}$ |
| BFSSC-20 | 6.4 | 11 | 3.75 | 1.81*10$^{-7}$-2.91*10$^{-10}$ |
| BFSSC-0 | 3.5 | 44 | 2.44 | 3.07*10$^{-7}$-1.40*10$^{-9}$ |

Example 11. Regeneration Method

The regeneration of the electrode is done by a simple process. The binder free electrode self-supporting cathode (BFSSC) is removed from the electrochemical cell once the delivered capacity is lower than desired. The electrode is then rinsed with a solvent or with water followed by heating in air. For the manganese oxide material described here, temperatures ranging from 200 to 400° C. were investigated with the most favorable results in the 200-350° C. range. After heating, the electrode is simply reinserted to the cell.

The invention claimed is:
1. A method of regenerating a self-supporting, binder-free electrode comprising:
providing a battery with a self-supporting, binder-free electrode comprising an electrochemically active material in the absence of a binder and a current collector, wherein the electrochemically active material is a self-supporting transition metal oxide;

removing the electrode from a battery with capacity fade; and regenerating the electrode by a thermal treatment under air, wherein the thermal treatment includes heating the electrode to a temperature of 300° C. for two hours, and placing the regenerated electrode in the battery or a new battery.

2. The method of claim 1, wherein the battery has undergone at least 50 cycles prior to electrode regeneration.

3. The method of claim 1, wherein the battery has undergone at least 250 cycles prior to electrode regeneration.

4. The method of claim 1, wherein the electrochemically active material is selected from the group consisting of $Zn_xO_y$, $Mn_xO_y$, $V_xO_y$, $Fe_xO_y$, $Sn_xO_y$, $La_xMn_yO_z$, $Ni_xCo_yO_z$, $Mo_xO_y$, and $Mn_wNi_xCo_yO_z$, wherein x, y, and z are numbers greater than 0.

5. The method of claim 4, wherein the electrochemically active material is cryptomelane type manganese dioxide OMS-2.

6. The method of claim 1, wherein the self-supporting transition metal oxide comprises nanofibers.

7. The method of claim 1, further comprising no more than 20% based upon the total weight of the electrode of a conductive additive selected from the group consisting of nanostructured carbon, graphitic carbon, conductive metal nanoparticles, and metal wire mesh.

8. The method of claim 7, wherein the conductive additive is nanostructured carbon and the nanostructure carbon is multi-walled carbon nanotubes, fullerene, or graphene.

9. The method of claim 8, wherein the nanostructured carbon is multi-walled carbon nanotubes.

10. The method of claim 7, wherein the weight ratio of active material to conductive additive is 5:0 or higher.

* * * * *